US00RE46826E

(19) United States
(12) Reissued Patent
Hill

(10) Patent Number: US RE46,826 E
(45) Date of Reissued Patent: May 8, 2018

(54) CARD HANDLING APPARATUS AND RELATED METHODS

(71) Applicant: Bally Gaming, Inc., Las Vegas, NV (US)

(72) Inventor: Otho D. Hill, Henderson, NV (US)

(73) Assignee: Bally Gaming, Inc., Las Vegas, NV (US)

(21) Appl. No.: 15/041,962

(22) Filed: Feb. 11, 2016

Related U.S. Patent Documents

Reissue of:
(64) Patent No.: 7,699,694
Issued: Apr. 20, 2010
Appl. No.: 10/439,789
Filed: May 16, 2003

U.S. Applications:
(60) Division of application No. 13/450,353, filed on Apr. 18, 2012, now Pat. No. Re. 46,505, which is an application for the reissue of Pat. No. 7,699,694, which is a continuation-in-part of application No. 09/905,478, filed on Jul. 13, 2001, now Pat. No. 6,582,301, which is a continuation-in-part of application No. 09/528,577, filed on Mar. 20, 2000, now Pat. No. 6,299,536, which is a continuation of application No. 09/031,321, filed on Feb. 26, 1998,
(Continued)

(51) Int. Cl.

| | |
|---|---|
| ***A63C 13/00*** | (2006.01) |
| ***A63F 1/18*** | (2006.01) |
| *A63F 1/00* | (2006.01) |
| *A63F 9/24* | (2006.01) |
| *A63F 1/14* | (2006.01) |
| *A63F 3/00* | (2006.01) |

(52) U.S. Cl.
CPC ..... *A63F 1/18* (2013.01); *A63F 1/14* (2013.01); *A63F 3/00157* (2013.01); *A63F 2001/008* (2013.01); *A63F 2009/2425* (2013.01); *A63F 2250/58* (2013.01)

(58) Field of Classification Search
CPC ..... A63F 13/00
USPC ..... 463/11, 47, 18–22; 273/149 R, 149 P
See application file for complete search history.

(56) References Cited

U.S. PATENT DOCUMENTS

| | | | |
|---|---|---|---|
| D132,360 | S | 5/1942 | Gardner |
| 3,124,674 | A | 3/1964 | Edwards et al. |

(Continued)

FOREIGN PATENT DOCUMENTS

| | | |
|---|---|---|
| DE | 3807127 | 9/1989 |
| DE | 3807127 A1 | 9/1989 |

(Continued)

*Primary Examiner* — Jeffrey R Jastrzab
(74) *Attorney, Agent, or Firm* — TraskBritt

(57) ABSTRACT

A system and method including card game dispensing shoe includes a scanner that discerns the value and suit of each card dispensed, and includes a CPU and a memory storing data such as rules for dealing cards, data representing player strategy criteria and card inventory data. The CPU, with the scanner data and wagering data can determine player proficiency in regards to player strategies, can determine whether the card inventory is in favor of the player, determine player first card advantage and can, on a floating basis, determine permitted deck penetration. The system and method can be incorporated into games to be broadcast over a communications network such as the Internet.

16 Claims, 21 Drawing Sheets

Related U.S. Application Data now Pat. No. 6,039,650, which is a continuation-in-part of application No. 08/543,908, filed on Oct. 17, 1995, now Pat. No. 5,722,893.

(56) References Cited

U.S. PATENT DOCUMENTS

| | | | | | |
|---|---|---|---|---|---|
| 3,897,954 | A * | 8/1975 | Erickson | A63F 1/14 | 273/149 R |
| 4,072,930 | A | 2/1978 | Lucero et al. | | |
| 4,283,709 | A | 8/1981 | Lucero et al. | | |
| D274,069 | S | 5/1984 | Fromm | | |
| 4,531,187 | A * | 7/1985 | Uhland | 463/12 | |
| 4,549,738 | A | 10/1985 | Greitzer | | |
| 4,586,712 | A * | 5/1986 | Lorber | A63F 1/12 | 221/224 |
| 4,750,743 | A | 6/1988 | Nicoletti | | |
| 4,807,884 | A * | 2/1989 | Breeding | A63F 1/12 | 273/149 R |
| 4,969,648 | A | 11/1990 | Hollinger et al. | | |
| 5,000,453 | A * | 3/1991 | Stevens | A63F 1/12 | 273/149 R |
| 5,259,907 | A | 11/1993 | Nierman et al. | | |
| 5,356,145 | A | 10/1994 | Verschoor | | |
| 5,362,053 | A | 11/1994 | Miller | | |
| 5,374,061 | A | 12/1994 | Albrecht | | |
| 5,377,973 | A | 1/1995 | Jones et al. | | |
| 5,382,024 | A | 1/1995 | Blaha | | |
| 5,416,308 | A | 5/1995 | Hood et al. | | |
| 5,445,377 | A * | 8/1995 | Steinbach | A63F 1/12 | 273/149 R |
| 5,515,477 | A | 5/1996 | Sutherland | | |
| 5,605,334 | A * | 2/1997 | McCrea, Jr. | 273/309 | |
| 5,632,483 | A | 5/1997 | Garczynski et al. | | |
| 5,636,843 | A | 6/1997 | Roberts | | |
| 5,651,548 | A | 7/1997 | French et al. | | |
| 5,695,189 | A * | 12/1997 | Breeding | A63F 1/12 | 273/149 R |
| 5,707,287 | A * | 1/1998 | McCrea, Jr. | A63F 1/12 | 273/292 |
| 5,720,484 | A * | 2/1998 | Hsu | 273/292 | |
| 5,722,893 | A | 3/1998 | Hill et al. | | |
| 5,735,742 | A | 4/1998 | French | | |
| 5,770,553 | A | 6/1998 | Kroner et al. | | |
| 5,779,546 | A | 7/1998 | Meissner et al. | | |
| 5,785,321 | A | 7/1998 | van Putten et al. | | |
| 5,788,574 | A | 8/1998 | Ornstein et al. | | |
| 5,803,808 | A | 9/1998 | Strisower | | |
| 5,813,912 | A * | 9/1998 | Shultz | 463/25 | |
| 5,851,011 | A | 12/1998 | Lott | | |
| 5,890,717 | A | 4/1999 | Rosewarne et al. | | |
| 5,919,090 | A | 7/1999 | Mothwurf | | |
| 5,941,769 | A | 8/1999 | Order | | |
| 5,957,776 | A | 9/1999 | Hoehne | | |
| 6,039,650 | A * | 3/2000 | Hill | 463/47 | |
| 6,093,103 | A | 7/2000 | McCrea, Jr. | | |
| 6,149,154 | A * | 11/2000 | Grauzer | A63F 1/12 | 273/149 P |
| 6,165,069 | A | 12/2000 | Sines et al. | | |
| 6,186,895 | B1 | 2/2001 | Oliver | | |
| 6,217,447 | B1 | 4/2001 | Lofink et al. | | |
| 6,267,671 | B1 | 7/2001 | Hogan | | |
| 6,299,536 | B1 | 10/2001 | Hill | | |
| 6,460,848 | B1 | 10/2002 | Soltys et al. | | |
| 6,464,584 | B2 | 10/2002 | Oliver | | |
| 6,508,709 | B1 * | 1/2003 | Karmarkar | 463/42 | |
| 6,514,140 | B1 | 2/2003 | Storch | | |
| 6,517,435 | B2 | 2/2003 | Soltys et al. | | |
| 6,517,436 | B2 | 2/2003 | Soltys et al. | | |
| 6,520,857 | B2 | 2/2003 | Soltys et al. | | |
| 6,527,271 | B2 | 3/2003 | Soltys et al. | | |
| 6,530,836 | B2 | 3/2003 | Soltys et al. | | |
| 6,530,837 | B2 | 3/2003 | Soltys et al. | | |
| 6,533,276 | B2 | 3/2003 | Soltys et al. | | |
| 6,533,662 | B2 | 3/2003 | Soltys et al. | | |
| 6,561,897 | B1 | 5/2003 | Bourbour et al. | | |
| 6,579,180 | B2 | 6/2003 | Soltys et al. | | |
| 6,579,181 | B2 | 6/2003 | Soltys et al. | | |
| 6,581,747 | B1 | 6/2003 | Charlier et al. | | |
| 6,582,301 | B2 | 6/2003 | Hill | | |
| 6,588,751 | B1 * | 7/2003 | Grauzer et al. | A63F 1/12 | 273/149 P |
| 6,595,857 | B2 | 7/2003 | Soltys et al. | | |
| 6,609,710 | B1 | 8/2003 | Order | | |
| 6,612,928 | B1 | 9/2003 | Bradford et al. | | |
| 6,619,662 | B2 | 9/2003 | Miller | | |
| 6,626,757 | B2 | 9/2003 | Oliveras | | |
| 6,629,019 | B2 | 9/2003 | Legge et al. | | |
| 6,629,591 | B1 | 10/2003 | Griswold et al. | | |
| 6,629,889 | B2 | 10/2003 | Mothwurf | | |
| 6,638,161 | B2 | 10/2003 | Soltys et al. | | |
| 6,652,379 | B2 | 11/2003 | Soltys et al. | | |
| 6,659,875 | B2 | 12/2003 | Purton | | |
| 6,663,490 | B2 | 12/2003 | Soltys et al. | | |
| 6,671,358 | B1 | 12/2003 | Seidman et al. | | |
| 6,685,564 | B2 | 2/2004 | Oliver | | |
| 6,685,568 | B2 | 2/2004 | Soltys et al. | | |
| 6,688,979 | B2 | 2/2004 | Soltys et al. | | |
| 6,690,673 | B1 | 2/2004 | Jarvis | | |
| 6,709,333 | B1 | 3/2004 | Bradford et al. | | |
| 6,712,696 | B2 | 3/2004 | Soltys et al. | | |
| 6,733,388 | B2 | 5/2004 | Mothwurf | | |
| 6,747,560 | B2 | 6/2004 | Stevens, III | | |
| 6,758,751 | B2 | 7/2004 | Soltys et al. | | |
| 6,834,251 | B1 | 12/2004 | Fletcher | | |
| 6,843,725 | B2 | 1/2005 | Nelson | | |
| 6,848,994 | B1 | 2/2005 | Knust et al. | | |
| 2002/0086727 | A1 * | 7/2002 | Soltys | G06K 7/084 | 463/22 |

FOREIGN PATENT DOCUMENTS

| | | | |
|---|---|---|---|
| WO | 9221413 | A1 | 12/1992 |
| WO | WO92/21413 | | 12/1992 |
| WO | WO96/07153 | | 5/1995 |
| WO | 9607153 | A1 | 3/1996 |
| WO | WO99/43404 | | 2/1999 |
| WO | 9943404 | A1 | 9/1999 |
| WO | 0205914 | A1 | 1/2002 |
| WO | WO02/05914 | | 1/2002 |

* cited by examiner

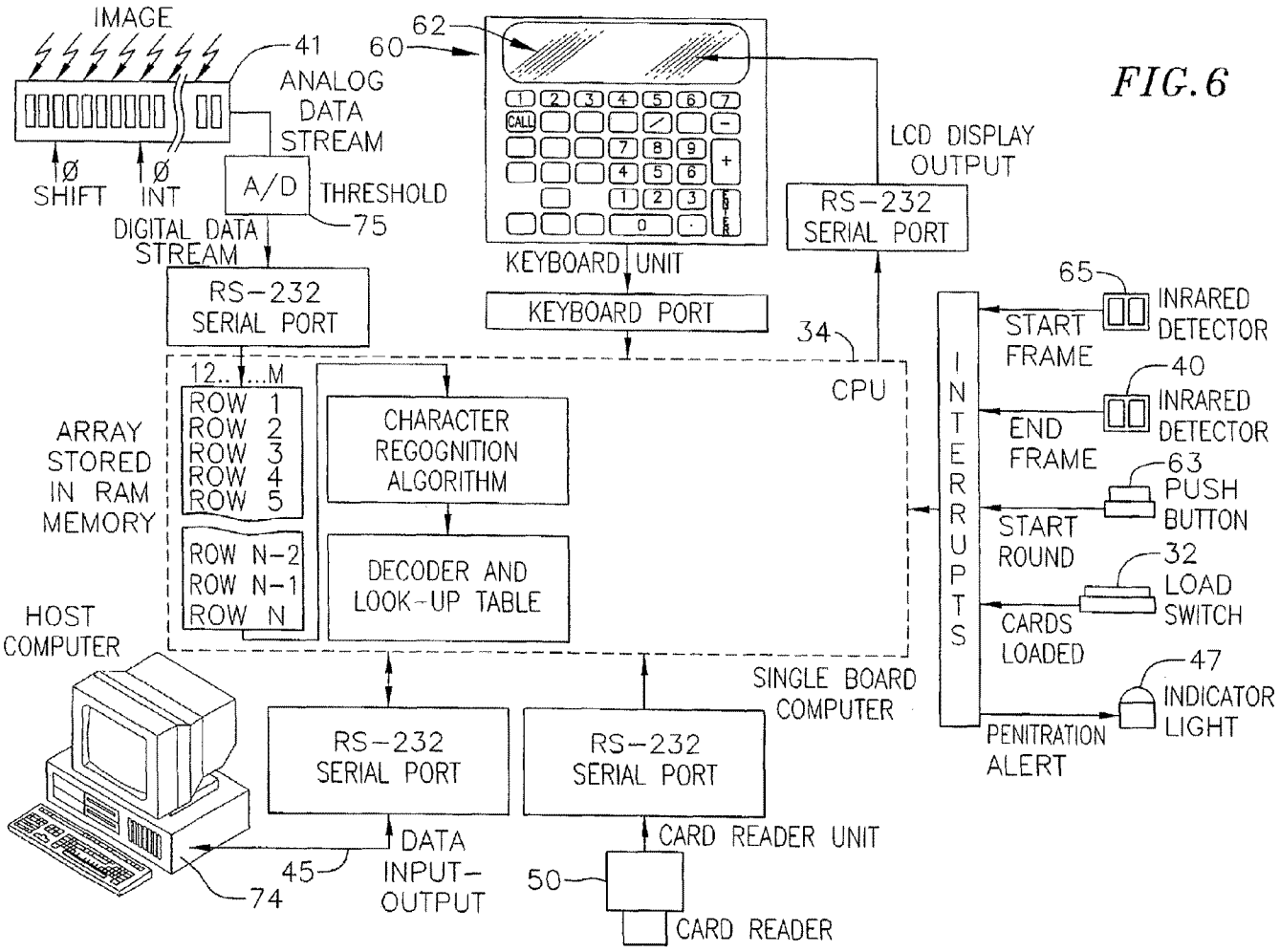
FIG. 6
INRARED DETECTOR
65
INRARED DETECTOR
40
PUSH BUTTON
63
LOAD SWITCH
32
INDICATOR LIGHT
47
START FRAME
END FRAME
START ROUND
CARDS LOADED
PENITRATION ALERT
INTERRUPTS
LCD DISPLAY OUTPUT
RS-232 SERIAL PORT
CPU
34
SINGLE BOARD COMPUTER
KEYBOARD UNIT
KEYBOARD PORT
CARD READER UNIT
CARD READER
50
RS-232 SERIAL PORT
CHARACTER REGOGNITION ALGORITHM
DECODER AND LOOK-UP TABLE
RS-232 SERIAL PORT
DATA INPUT-OUTPUT
45
74
62
60
ANALOG DATA STREAM
41
THRESHOLD
75
A/D
RS-232 SERIAL PORT
DIGITAL DATA STREAM
IMAGE
Ø INT
Ø SHIFT
12...M
ROW 1
ROW 2
ROW 3
ROW 4
ROW 5
ROW N-2
ROW N-1
ROW N
ARRAY STORED IN RAM MEMORY
HOST COMPUTER 2
16
3
4
26
21
28
27
25
24
23
22
9
8
6
10
12
BANK
PLAYER 56
52
51
2

CARD HANDLING APPARATUS AND RELATED METHODS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Notice: More than one reissue application has been filed for the reissue of U.S. Pat. No. 7,699,694. This reissue application is a divisional reissue application of Reissue application Ser. No. 13/450,353, filed Apr. 18, 2012, now U.S. Pat. No. RE46,505, issued Aug. 8, 2017, each of which is a reissue of U.S. Pat. No. 7,699,694, on behalf of Otho Dale Hill. Reissue application Ser. No. 13/450,353, filed Apr. 18, 2012, now U.S. Pat. No. RE46,505, issued Aug. 8, 2017, is also the parent of Divisional Reissue application Ser. No. 15/439,307, filed Feb. 22, 2017, which is also a reissue application of U.S. Pat. No. 7,699,694, issued Apr. 20, 2010, on behalf of Otho Dale Hill.*

CROSS REFERENCE TO RELATED APPLICATIONS

This application is a continuation-in-part of application Ser. No. 09/905,478, filed on Jul. 13, 2001, now U.S. Pat. No. 6,582,301, which is a continuation-in-part of application Ser. No. 09/528,577 filed on Mar. 20, 2000, now U.S. Pat. No. 6,299,536, which is a continuation of application Ser. No. 09/031,321, filed on Feb. 26, 1998, now U.S. Pat. No. 6,039,650, which is a continuation-in-part of application Ser. No. 08/543,908, filed on Oct. 17, 1995, now U.S. Pat. No. 5,722,893.

FIELD OF THE INVENTION

The invention relates to card game monitoring and display devices and systems, and more particularly to a system which provides for the acquisition of data representing the identification of cards distributed to players (and dealer's) hands during the course of a live table card game and which provides for utilization of the [the] data to derive one or more parameters regarding the game and play and for real time or post-game analysis. In certain embodiments the derived data may be utilized in real time to control devices to display desired information or to prevent the dispensing of cards from the shoe or to command that the game dealer perform an operation such as re-shuffling and re-loading the shoe from which cards are dispensed or to determine adherence by one or more players to certain predetermined play strategies.

The system may further include one or more data input or acquisition devices to input other information such as player wager amounts and the number and positions of players.

BACKGROUND OF THE INVENTION

Card dispensing shoes for dealing or delivering cards in casino card games are known in the art. Without limitation, such card games of chance include 21 or Blackjack, Baccarat, [Carribean] *Caribbean* Stud, Let It Ride, and Poker. The shoe is placed near a dealer's station on a card game table, and at least one deck of cards is placed in an opening at the shoe top during the play of a particular card game. Cards are placed face down in the shoe, and only the back side of the top card in the deck is observable while the cards are in the shoe. The dealer feeds cards for delivery to players at the table by manually engaging and forcing the top card of the deck through a card outlet at the front of the shoe. The dealer pulls the top card from the deck and it is delivered or dealt to a game player or game hand. A series of cards is thus delivered, one-by-one, to the players at the card game table until each player or game hand has the requisite number of cards for playing the game. The shoe remains in view of the dealer and game players, and, absent cheating, neither dealer nor any player is aware of any of the cards value.

Cards for [Carribean] *Caribbean* Stud and Let it Ride are normally dealt from an automatic shuffler or card dispenser ([a]*an* electronic/mechanical device that physically resembles standard type manual card dispensing shoes). The cards are dealt one-by-one until the requisite number of cards for a game hand are dealt into a tray or receptacle adjacent the mouth of the automatic shuffler or card dispenser. The dealer then removes each game hand from the receptacle and delivers cards in a sequence per game rules to game player(s) and to the dealer, as the player's or the dealer's game hand for the current game round.

Card dispensing shoes for Baccarat differ somewhat from card dispensing shoes for Blackjack in that all Baccarat shoes traditionally have a removable fitted cover; and Blackjack shoes do not. The cover protects cards in the card chute from access by the game player(s), or by the game-designated banker, presently in possession of the shoe. Such shoes contain and secure the game deck before and during removal and delivery of cards comprising the player hand and bank hand, for each game round dealt.

Baccarat is vulnerable to cheating in that many people may come in contact with the playing cards. When playing Baccarat at a Mini-Baccarat table, the dealer acts as Banker and players normally do not touch the cards. But in traditional Baccarat, played at a standard sized Baccarat table, the game player dealing the Player and Bank hands from the shoe for a game round is designated as the Banker. During the game, other game players and the dealer(s) also handle the cards comprising the dealt Player and Bank hands, and thus the game is vulnerable to various forms of cheating by players and unscrupulous casino employees. Prior art shoes do not, for example, provide a mechanical barrier to preclude removing cards from a shoe during times that the rules of the game being played do not allow card removal. A skillful person in possession of the shoe may be able to slightly slide the top card out of the shoe sufficiently to determine suit or value, and then quickly return the card into the shoe, without being observed by others at the game table. A player's a priori knowledge of what the top card (not yet dealt) will be can provide a statistical advantage in placing a large bet on the winning hand for the upcoming game round.

The high betting limits associated with Baccarat games attracts professional card cheats and can tempt unscrupulous players and employees to cheat. Casinos lose tens of millions of dollars annually due to individual cheaters or teams of co-conspirators playing the game of Baccarat. Known methods of cheating in Baccarat include the Banker inadvertently or surreptitiously exposing the top card of the deck to be dealt the Player hand as the first of two cards that will comprise the original Player hand before final wagers have been made by the game players for an upcoming game round. This advance knowledge will permit a player to wager relatively confidently since the value of the top card is illicitly known. Cheat methods also include the Banker and/or game players switching cards dealt from the shoe designated, per game rules, for delivery to the Player hand, or cards designated for delivery to the Bank hand, and [visa] *vice* versa. Cheat methods also include switching cards derived from a source other than the shoe for cards designated for delivery to the Player and/or Bank hands. These illicit activities can allow the Banker and/or confederates to place very high wagers, based upon their prior knowledge of the value of the cards switched or the cards to be dealt to the Player and/or Bank hands from the shoe.

Yet other cheating methods include the Banker covertly altering the delivery sequence of the cards dealt from the shoe. For example, the first card dealt from the shoe, contrary to game rules, is "misdealt" to the Banker instead of the Player hand. This action allows players with knowledge of the "misdeal" to make extremely high wagers without risk of actual loss. This is because casino Baccarat games are routinely video tape recorded and stored for typically at least five days. Thus, a player, with knowledge of "misdeal" whose bets have generated a negative return will challenge the dealer for a misdeal, and will demand that the video tapes be consulted to resolve the issue. Once the video tapes confirm the misdeal, the subsequent bets would be set aside. If necessary, a losing player can ask the Nevada Gaming Control Board to investigate and after confirming the misdeal, order reimbursement of all losses. Of course had the bets turned out favorably, the player(s) would never challenged the "misdeal".

Yet another Baccarat cheating scheme involves illicitly gaining prior knowledge of the top card of the deck to be dealt to the Player, or of the value of yet unexposed card(s) comprising the Player or Bank hands. Should opportunity or distraction (perhaps created by a cohort) permit, a cheating player may stealthily change or move his/her wager from Player to Bank, or vice versa. In other cheating schemes, unscrupulous employees cooperate with players and steal new and unopened decks of cards from a casino's card inventory, open and illicitly mark the backs of the stolen decks of cards, and then reseal the marked decks, which are returned to the casino's Baccarat card inventory. When eventually the marked cards are brought into play, the employee notifies the co-conspirators who enter into the game play, with a secret ability to read the values on the marked cards, including an ability to read what the first card to be dealt to the Player hand will be.

Using a randomly shuffled Baccarat deck that comprises eight standard fifty-two-card decks of playing cards, a Baccarat player theoretically is expected to win 44.62% of wagers bet on the Player Hands, 45.85% of wagers bet on the Bank Hands, and 9.53% of wagers bet on the Tie Hands. The Player hand has an advantage when the first card dealt to it has a card value of 6, 7, 8, or 9. When the first card dealt to the Player hand has a game card value of 1 (the Ace), 2, 3, 4, 5, or 10, (Jacks, Queens and Kings each have a game card value of 10), the Bank hand has an advantage. In each game round there is an overall probability of approximately 9.50% that the Player and Bank hands will Tie. The probability of a Tie hand is greatest when the first card dealt to the Player hand is a 7, and a Tie hand is least probable when the first card dealt to the Player hand is a 10 valued card, etc.

It will be thus appreciated that if a Baccarat game player somehow gains knowledge of the value of the first game card to be dealt from the shoe before that card is removed from the shoe and delivered to the Player hand, that player can have a significant game advantage. For example, if it is known the first card will be a 6, 7, 8, or 9, a high bet would be placed for the Player hand. If it is known the first card will be an ace, 2, 3, 4, 5, or 10-valued card, a high bet would be placed for the Bank hand. If it is known the first card will be a 7, a high bet would be placed on the Player hand and/or a Tie bet may be made. Since very substantial wagering often occurs in Baccarat, secret knowledge of the first game card to be dealt to the Player hand is a powerful tool indeed.

Thus, there is a need to provide a host casino with a shoe system that can provide a realtime mechanism for identifying and recording, preferably with 100% accuracy, the card value, card rank, card suit, and sequence in which each card removed from the shoe was delivered to the Player or Bank hands. Further, such shoe system should provide a mechanism to track the wager type (Tie, Player, and/or Bank), and amount per wager made by each Baccarat player. Such shoe system would enable the casino to identify in real time most cheating methods, and to calculate the probability that a Baccarat game player has prior knowledge of the top card of the deck before that card was removed from the shoe. In addition, such shoe system could reduce dealer errors and resultant game disruptions and casino income loss, and could also provide the casino with a software routine that would automatically calculate and display with a high degree of accuracy, commissions payable to the casino on all winning Bank wagers, and could also provide more accurate rating information for Baccarat game players. Such information would allow a casino to more precisely calculate its Earning Potential and Complimentary Equivalency for each game player, and to further speed up the progress of the game, which in the long run will increase casino profits.

There is a need for a shoe that can mechanically bar removal of cards during periods when the rules of the game being played prohibit card removal. Such a shoe could more securely protect the host casino against dealer error and card cheats, while speeding up game play. In Baccarat, such a shoe would guard against errors and cheating with respect to the first card dealt to a player hand, and with respect to the first card advantage associated with that game.

Prior art shoes, automatic card shuffler(s), and card dispensing devices can adequately deliver cards one-by-one to the game players and/or the game dealer, or to a tray or receptacle, but there is room for improvement, especially in a high stake game such as Baccarat. Such shoes do little or nothing to guard against cheating, including recognizing illicit markings on the game cards that can enable identification of the value of the top card(s) in the deck to be dealt from the shoe before placing a wager on the outcome of upcoming game round(s). A player somehow able to read or decipher the value of a card that has been illicitly marked, or who somehow knows what card is next in the shoe and is about to be dispensed can gain valuable statistical knowledge. Using this advance information, such player will know when to wager a large bet on the Player or on the Bank hand, depending upon the player's unique and illicit knowledge of the first card about to be dealt from the shoe and delivered to the Player hand. (The terms "Bank" and "House" may on occasion be referred to interchangeably herein.)

Card dispensing shoes with a scanning unit should preferably monitor and identify the value, rank, suit, and delivery sequence for each card dealt to a game seat, a game player, or a game hand that may include a game dealer, to guard against introduction of a card into a game from a source other than the deck contained in the shoe. Such shoes should ensure that cards have not been illicitly removed from the shoe and/or diverted to an unauthorized game hand by the Banker or the game Caller. Such shoes should further ensure that the cards comprising the Bank hands and Player hands, when tossed to the Caller by the Banker and/or a player have not been switched by the Banker, the Player or the Caller before the respective game hands are faced-up on the game table top layout and the game hand scores are called by the Caller. Further, such shoes should ensure that Player hand cards delivered by the Banker to the Caller are not switched by the Caller before delivery to a player designated to play the Player hand. Such shoes should ensure that the player designated to play the Player hand cannot switch Player hand cards before giving the hand back to the Caller. Thus, shoes should identify changes to the value of the game hand and to the outcome of the game round, in the event any of the original cards dealt from the shoe, regardless of whether the Banker, the Caller, or the designated game player attempts to make the switch without being detected.

There is a need for a shoe that can prevent a person in possession of the shoe from inadvertently or intentionally removing a card from the shoe, and/or surreptitiously exposing the value of the top card to a game player(s) who may then wager on the Player or Bank hand, before commencement of the game round, based on the secret knowledge of what the top card will be. Such shoe should preclude fraudulent activities by players and/or the game dealer(s), as such activities can affect the game outcome and thus the profit margin of the casino or other gaming location hosting the game. In practice, if exposure of a game card becomes [know] *known* to the gaming casino management, the card is removed from play (burned) or placed in the discard rack, thus altering the sequence of cards comprising game hands for subsequent game rounds dealt from deck(s) contained in the shoe. Such removal of a game card from play can bring concern and anguish among game players and management alike, because of the high bets that may be wagered on the outcome of the game round now affected due to the removal of the exposed card. A player who feels victimized by the circumstances surrounding the exposed card may leave the game, never to return to the host casino.

Thus, there is a need to determine and reduce dealing errors by mechanically blocking the removal of a top card from a shoe during times that rules for the card game being played do not call for the removal or exposure of a card contained in the shoe. Such a mechanical block would preclude cheating by persons skilled in rapidly sliding the top card out of the shoe sufficiently to quickly turn up a corner of the card to learn the card suite or value or both.

Further, there is need for improved display mechanisms for use during the game of Baccarat, especially if it is desired to electronically record individual and cumulative wager types, e.g., Tie, Player or Bank, and/or individual and cumulative bet amounts. Prior art mechanisms are relatively primitive, labor intensive and inaccurate with respect to maintaining a record of each [player'bets] *player's bets*, wins, losses, for each game round for the duration of each customer's play. There is a need for a mechanism to implement such record keeping and to display results, especially for the dealer's and management's use. Such mechanism could enhance accuracy and speed of posting of commissions collected or owed on winning Bank hands, preferably while increasing the security of the game without forfeiting the number of rounds-dealt-per-hour. Further, there is a need for such mechanism to also record and track pertinent data relevant to rating a customer's play for purposes that include rapidly and accurately determining a casino's earning potential and complimentary equivalency for each game player during real time.

Because of the high betting limits, Baccarat game players tend to receive a relatively high percentage of all complimentary expenditures extended by host casinos. But as noted, it is difficult in the prior art to always guard against cheating in Baccarat. Therefore, a need exists to provide casinos, during real time, with an improved means of recording player rating information, and a real time means to identify most methods of cheating or defrauding the casino card game of Baccarat. Further, there is a need to provide tables on which card games of chance are played with data input mechanisms to permit a dealer to input data relative to the play of the game and the game players, and for display mechanisms to allow the dealer to see game statistics on a per hand and per player basis, and to permit the dealer and management to observe trends suggesting on-going cheating during the play of the game. Further, there is a need to provide remote display mechanisms to allow game supervisors to see game statistics on a per hand and per player and per dealer, and per game table basis, and to permit the game supervisor to observe trends in the play of the game suggesting that one or more game players may be engaged in activities that threaten the assets of the game, and individual player rating information for each game player.

As noted, improved shoe systems can make card games of chance less prone to cheating and to error, and more efficient to play, especially from the casino's standpoint. But there is a need for a mechanism that allows more than a handful of spectators to wager on the outcome of such card games. More specifically, there is also a need for a mechanism by which card games of chance played with improved card shoes and card shoe systems can be broadcast widely over a distribution medium such as the internet such that spectators can view and wager upon the game in real time, precisely as though they were in the casino standing or seated near the actual player participants. Such medium-wide play can further enhance the casino's revenues and can be implemented to provide substantially real time payoffs, be it to the remote viewer bettor, or to the casino.

The present invention provides such improved game shoes, game shoe systems, game play [tables,.and] *tables, and* a system permitting internet-transmittable transmission of card games of chance played with such shoes and shoe systems, to enable remote viewers to see the game and the scanner output image of each card dealt from the shoe, and to wage bets remotely.

In regards to the Game of Blackjack, it has been known for player's to play according to certain predetermined strategies, each purported to reduce the "edge" the casino has in the game. These strategies are known or are ascertainable inasmuch as many are published. One such technique is known as a card count system where players adhering to the system keep count of one or more values of cards which have been dealt and by simply math can then determine if the remaining inventory of cards left to be dealt from the shoe are such as to give the player a Count System Advantage, i.e. the inventory has been depleted such that the player has a higher probability of being dealt a winning hand (the shoe turns "positive" for the player). In such cases the player would increase their wager to take advantage of the "positive" card inventory and will adhere to certain play strategies such as surrendering, insuring, standing, hitting doubling, or splitting their hand based upon the value of the dealer's face up card, the total of the cards comprising the player's hand; and the true count of the deck remaining in the shoe.

Cheating can also occur by means of an accomplice dealer exposing or otherwise conveying the dealer's face down card to one or more accomplices.

The adherence of a player to a known play strategy can reduce the casino's profit (or expected profit) based upon this player's play. This information or suspicion of a player employing a play strategy heretofore was ascertained by an experienced dealer or game supervisor observing the player's play over a period [or] *of* time. It would be advantageous to provide a system and method which could provide for an automated analysis of play of one or more players and to provide a signal or alarm when a strategy is suspected. Play according to a strategy may be used to rate the player since such play theoretically may affect the theoretical win from this player and hence could be used in determining the "comps" which should be provided to the player.

To frustrate possible strategy players, if such activity is suspected it is known to command reconstitution and reshuffling of the card inventory. For example, when the dealer first shuffles and loads the shoe, they typically place a marker card in the inventory about one deck from the last card. Cards are dealt from the shoe until the marker card is dealt at which time the current hand is completed. The dealer then gathers all of the cards to reconstitute the inventory to, for example six decks, and re-shuffles to randomize the inventory. The stack of shuffled cards is placed in front of a player who places the marker card in the stack and the stack is cut at the marker card and thereafter is re-loaded back into the shoe. The marker card is placed in the stack about two decks (104 cards) from the last card of the shoe.

As stated above, if there is a suspicion that a player is playing proficiently according to some system or criteria, the pit boss may command more frequent shuffling. Frequent shuffling results in an economic loss to the casino since the time the dealer is reconstituting and re-shuffling interrupts play (and the placement and loss of wagers) and may cause impatient players to leave the table. There is needed a system and method which can assess the strategy and betting proficiency of each of the game players relative to a predetermined Count System Advantage when the system identifies a player as playing at a specific playing strategy and/or betting proficiency commands reconstitution and re-shuffling of the deck when a specific control inventory ("deck") penetration is achieved. That is, if there are no proficient players playing at the game table, the inventory may be penetrated or depleted, for example, to leave 26 cards remaining in the deck carried by the shoe before reconstitution and re-shuffling the deck thereby maximizing the number of hands dealt-per-shoe without jeopardizing the house or game advantage to any highly skilled card count system player; and whereas if the system detects that one or more highly proficient players are present at the game table the system will search the systems Count System Advantage database and select and automatically reset the house deck penetration rule for the, reconstitution and re-shuffling of the deck that conforms to a deck penetration rule at which the system knows that any game advantage that a player may gain over the house when playing a card count system at a specific proficiency when playing against a specific set of game rules and house deck penetration rule; and when the selected deck penetration is achieved the system, card barriers will raise upon the completion of the current game round forcing the game dealer to remove the deck for the reconstitution and re-shuffling of the deck; and/or an audible or visual alert may be activated to command the dealer to remove the cards remaining in the shoe and re-shuffle more frequently.

In this regard, in Blackjack there may *be* what are referred to as "back counters" who are bystanders (not engaged in the play of the game) counting cards until the deck turns positive and they, the "back counters" then seat themselves and place a wager for the upcoming game round. To prevent the losses that can be inflicted on a game by the[.] "back counters", some casinos prevent all players from entering a game mid-shoe. New players must wait until the shoe is being reconstituted and-re-shuffled before entering the game. As can be appreciated, mid-shoe entry is most disadvantageous for the house, and advantageous for the players, when the deck carried by the shoe is positive. In other circumstances a blanket ban on mid-shoe entry may result in a loss of game revenue by turning away players who do not want to wait. There is a need for a system and method which can determine when the shoe is positive (favorable to the player) to signal that new players (possible back counters) cannot now enter the game. Otherwise mid-shoe entry would be permitted.

In still another aspect, it is known to broadcast both live and virtual games over the Internet for live play by remote players at their computer terminals. For particularly live games or virtual games where a virtual inventory of cards, e.g. a simulated shoe of one or more decks is depleted through virtual dealing of cards, there is a risk that the remote player would play a Blackjack card counting system with or without the aid of a computer on which is installed a card counting software program. It would be advantageous in situations where particularly live gaming is being broadcast to be able to determine the likelihood of such activity to either control that player's participation or to command reconstitution and re-shuffling the shoe to prevent the players from obtaining an advantage over the casino.

SUMMARY OF THE INVENTION

There is, therefore, set forth according to the present invention a system and method which can determine player proficiency in regards to the play of a game, circumstances suggesting cheating, permit greater penetration of the deck carried by the shoe and thereby the dealing of more hands per hour at the table, controlling mid-shoe entry conditions as well as providing the same in connection with games broadcast over the Internet medium.

[According] *Accordingly,* there is set forth a game monitoring system and method for a card game including at least two competing hands of cards and where a player wagers on at least one of said hands. The system includes a shoe having a housing with an outlet slot, the housing sized to store a plurality of playing cards defining a card inventory. For example, for a game such [a] *as* Baccarat, the shoe may be configured to hold eight decks and for Blackjack, six decks of playing cards. The shoe is configured for a dealer to dispense said cards one at a time through said outlet slot to complete said hands according to the rules of the game.

To determine the cards dealt to each hand there is provided a scanner which scans the playing cards and generates a set of scanner signals determinative of the identify of cards dealt to each game hand. There is also provided means for acquiring data representing the wagers made by the player. These means may be automatic or may be input by the dealer for each round of play.

A memory stores data representing at least one predetermined player game play criteria in relation to at least one of the player's wager or the cards dealt to at least one of said hands. For example the criteria may be, in Baccarat, wagers by the player versus the value of the first card dealt to the Player hand to suggest a priori knowledge of the first card, in Blackjack, card counting data or, for example, the player's wagers, game play actions (standing/hitting) versus the count of the inventory, the dealer's face up card, the value or score of each hand and the like. A computer processor is provided to receive said scanner signals and said wager data, the processor being configured to compare said acquired data to said at least one predetermined game play criteria to determine adherence by the player to said at least one predetermined game play criteria.

In other embodiments each of the cards are scanned before they are burned, or dealt to a game, player, or dealer hand.

In further embodiments the shoe includes the scanner disposed at said outlet slot to scan each card as it is dispensed by the dealer to the hands of play.

In yet another embodiment where the card game is Baccarat, the memory stores data representing the sequence of cards to be dealt to each hand according to the rules of Baccarat and the processor configured to compare the sequence of cards dispensed to said game rule sequence data stored in said memory and to, if desired, issue a signal to the dealer of a mis-deal.

In further embodiments the memory stores data representing game play criteria of wagering patterns of the player over a series of game rounds suggestive of the player having a priori knowledge of the first card to be dispensed from the shoe to the Player hand.

Where the game is Blackjack, the method and system of one embodiment include the processor accepting the scanner signals to determine the characteristics of the card inventory according to any one or more card counting systems as well as any other criteria pertinent to the game. Based upon a determination matrix, the processor may command more frequent shuffling of the cards, permit or bar mid-shoe entry into a game and/or determine player proficiency according to Blackjack play strategies.

Still further the systems and methods of the present invention may be employed to monitor Internet play, particularly of live Blackjack or Baccarat games, to detect adherence by a player to a play strategies suggesting the use of a card counting computer.

Still further the systems and methods of the present invention may be employed to monitor Internet play of virtual Blackjack or Baccarat games offered by online casinos to remote players to detect adherence by a player to one or more play or betting strategies suggesting the use of a card counting computer to analyze the composition of the deck.

BRIEF DESCRIPTION OF THE DRAWINGS

These and other features and advantages will become better understood with reference to the description, claims and drawings wherein:

FIG. 6 is system block diagram for an embodiment of electronics for a card dispensing shoe with scanner, according to the present invention;

*FIG. 22* is a cutaway front view of an embodiment of a shoe equipped with movable mechanical barriers carried within the embodiments of FIGS. 10, 12, 15 and 17, according to the present invention;

DESCRIPTION

Figure 1:
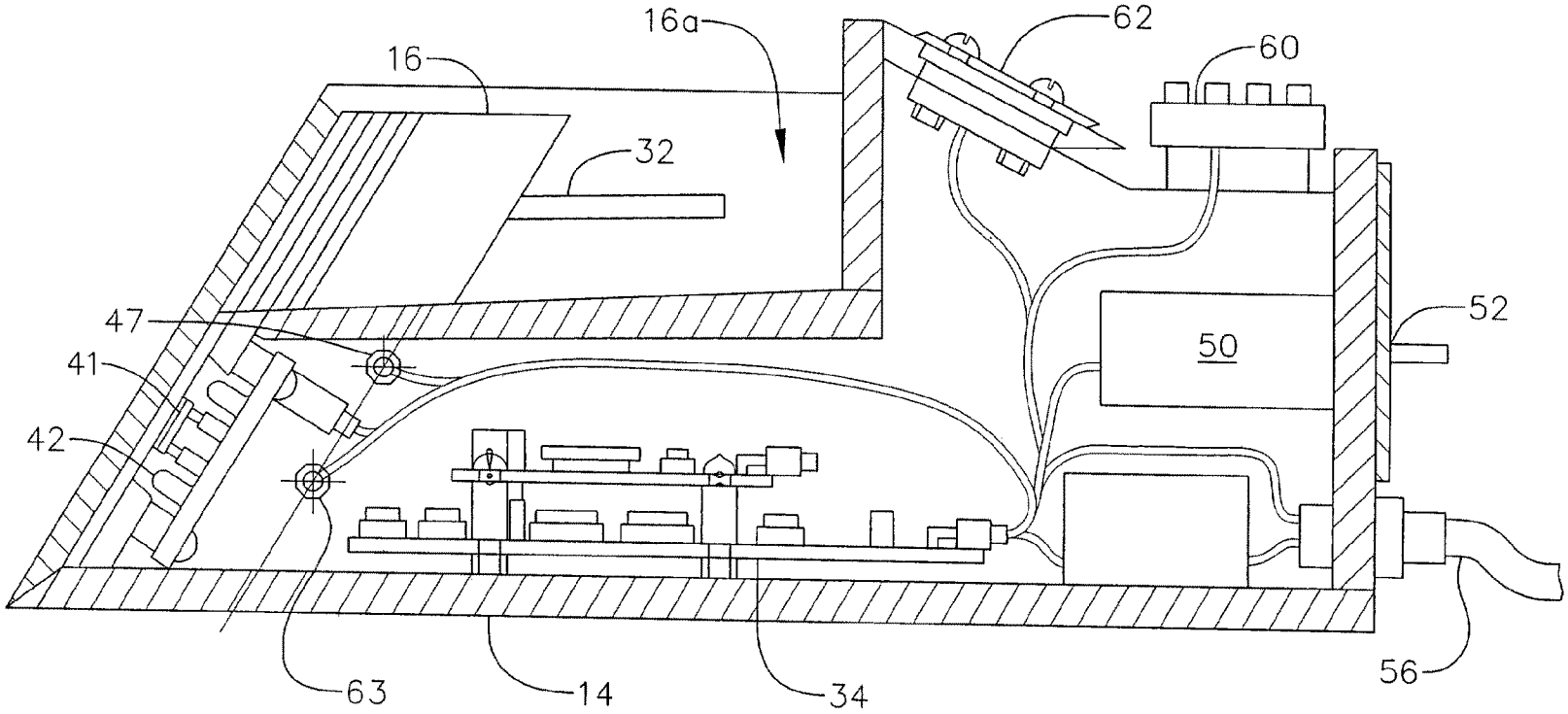
FIG. 1 is a vertical section of a card dispensing shoe with scanner, according to the present invention.

A. Card Dispensing Shoe with Scanner, a First Embodiment:

A first embodiment of a card delivery or dispensing shoe with scanner and a system and method for using the shoe and scanner will be described with reference to FIGS. 1-5, in which FIG. 1 is a vertical section taken along line 1-1 of FIG. 3.

Figure 3:
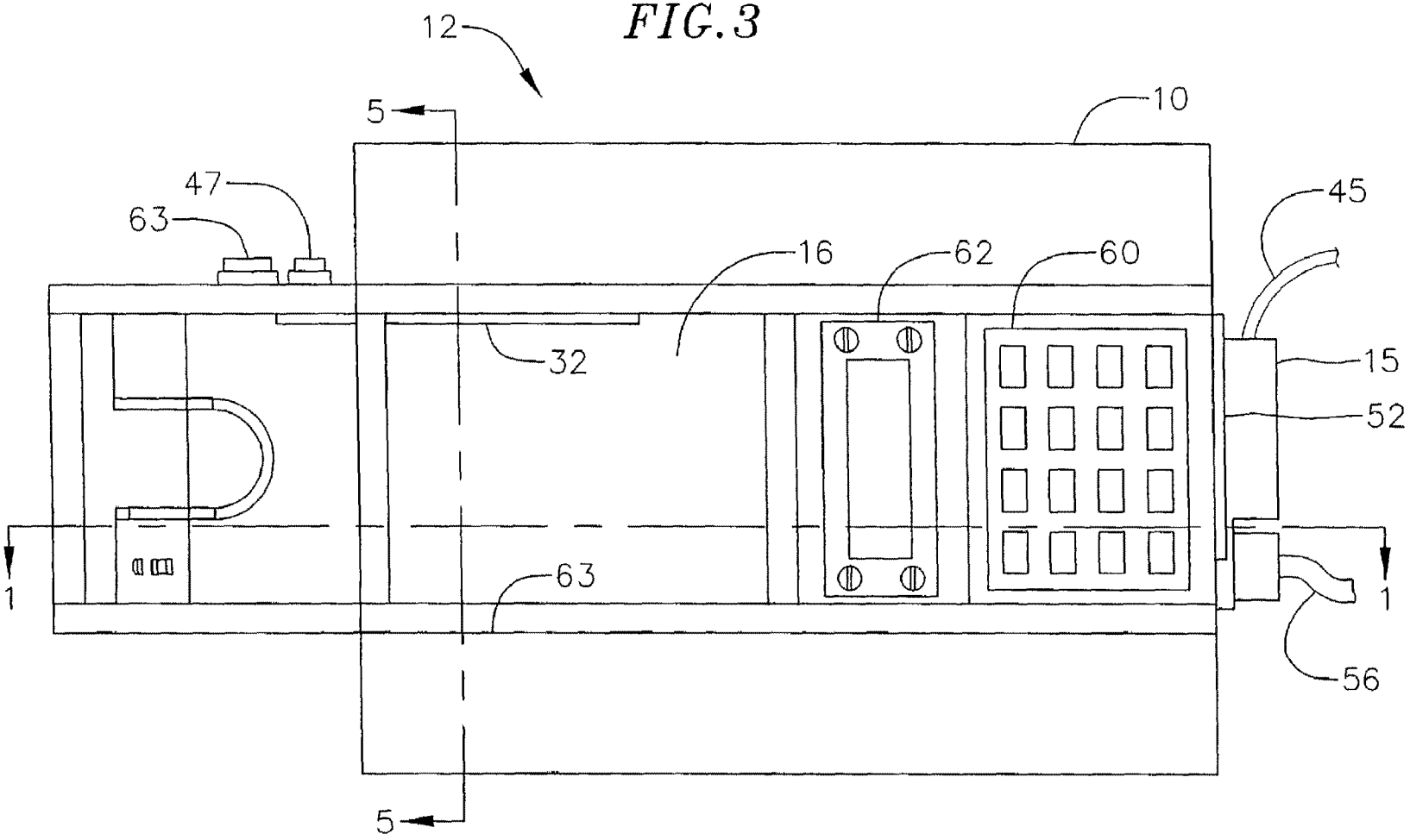
FIG. 3 is a top plan view of a card dispensing shoe with scanner, according to the present invention.
Figure 4:
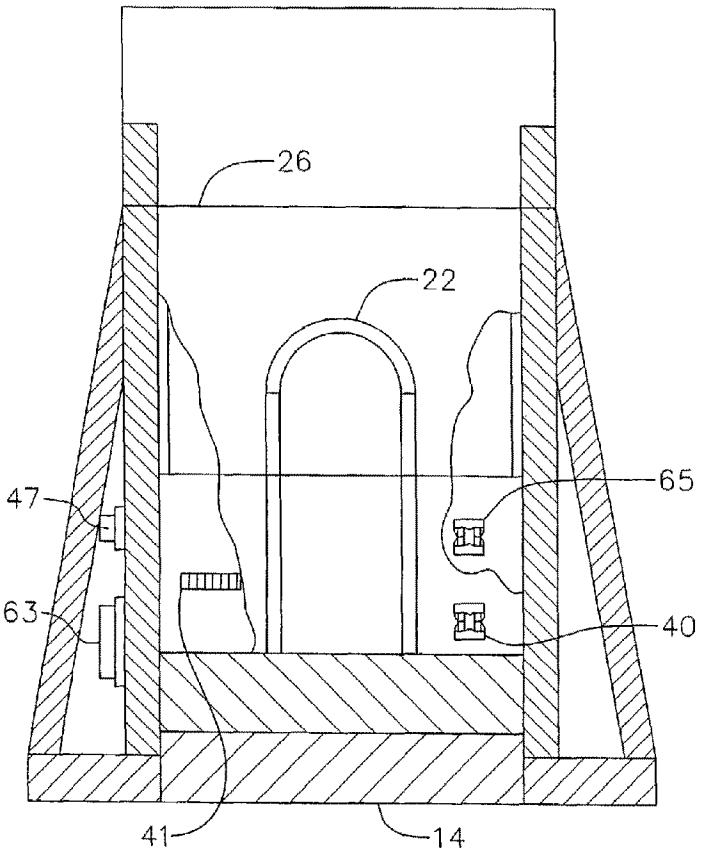
FIG. 4 is a front elevation view of the shoe of FIG. 3, showing card delivery from under the shoe, according to the present invention.

As best seen in FIG. 3, shoe 10 includes a container or housing 12 whose lower surface 14, as seen in FIGS. 1 and 4, is designed to rest and be supported on a flat surface such as a gaming table, typically in a host casino in which card games of chance are being played. As seen in FIGS. 1 and 3, shoe 10 is sized to retain or support at least one deck 16 and up to eight decks of playing cards in a chute 16a.

Figure 2:
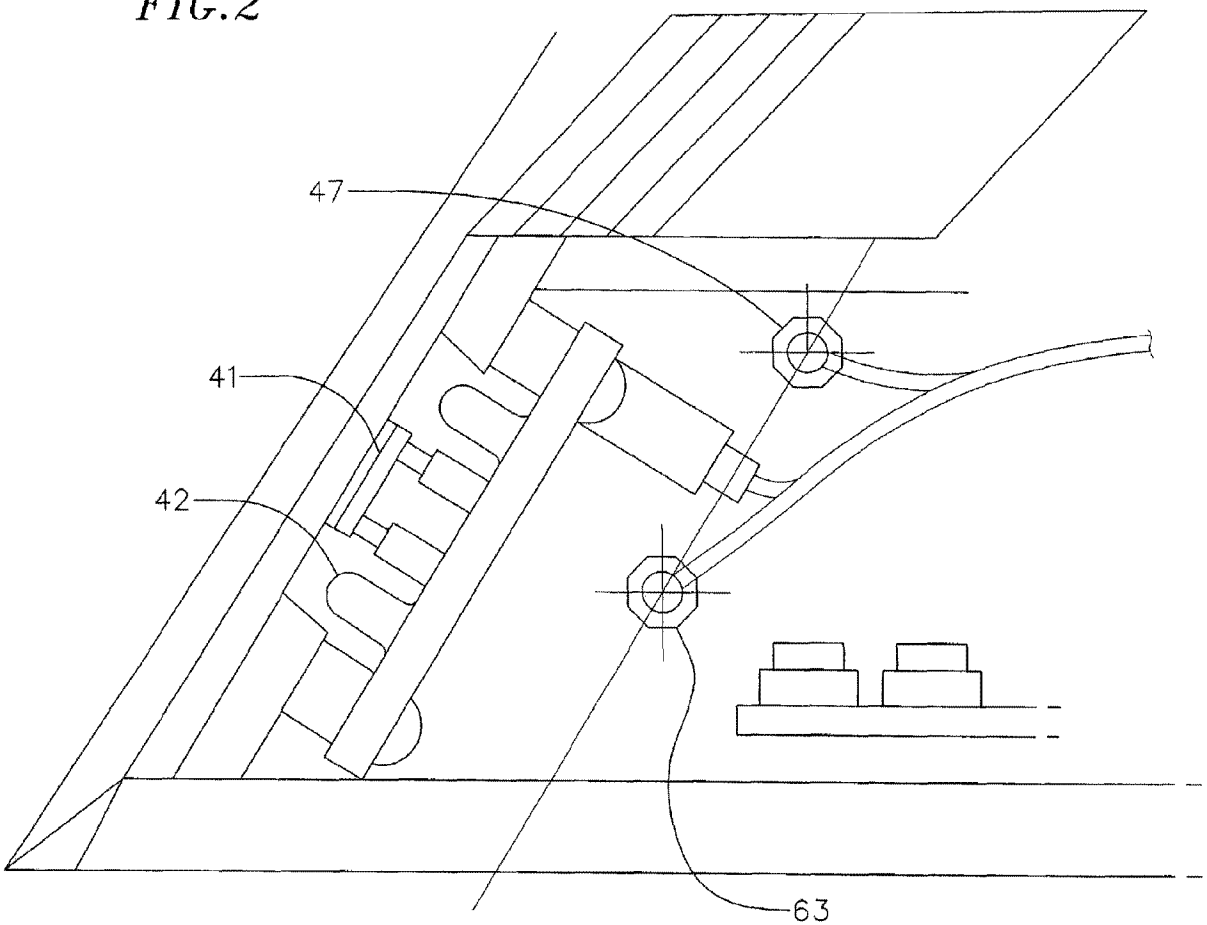
FIG. 2 is a close-up enlarged view of a portion of the shoe and scanner shown in FIG. 1, according to the present invention.
Figure 7:
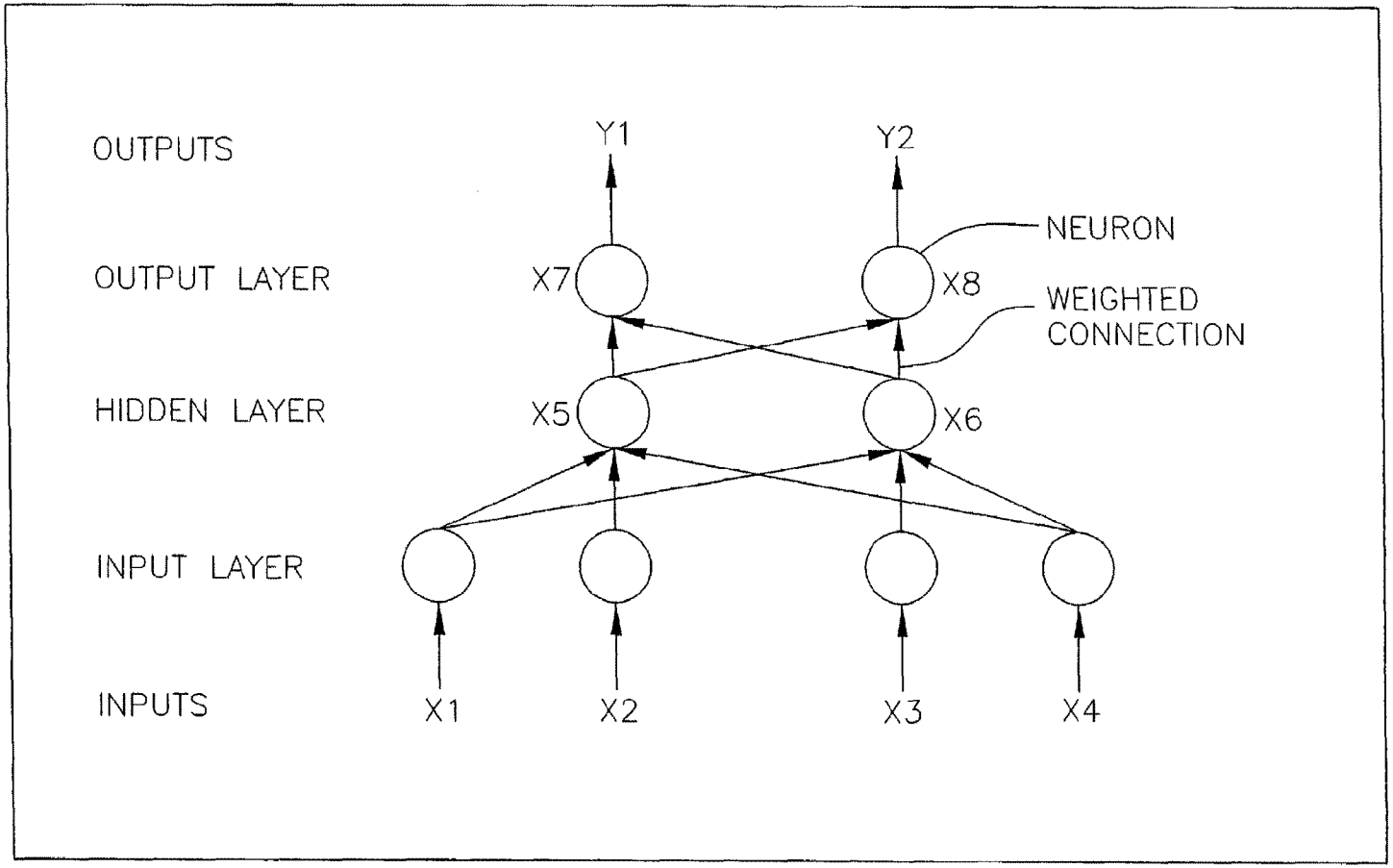
FIG. 7 is a schematic view of a three-layer feed forward multi-layer perception neural network useful with a card dispensing shoe with scanner, according to the present invention.
Figure 8:
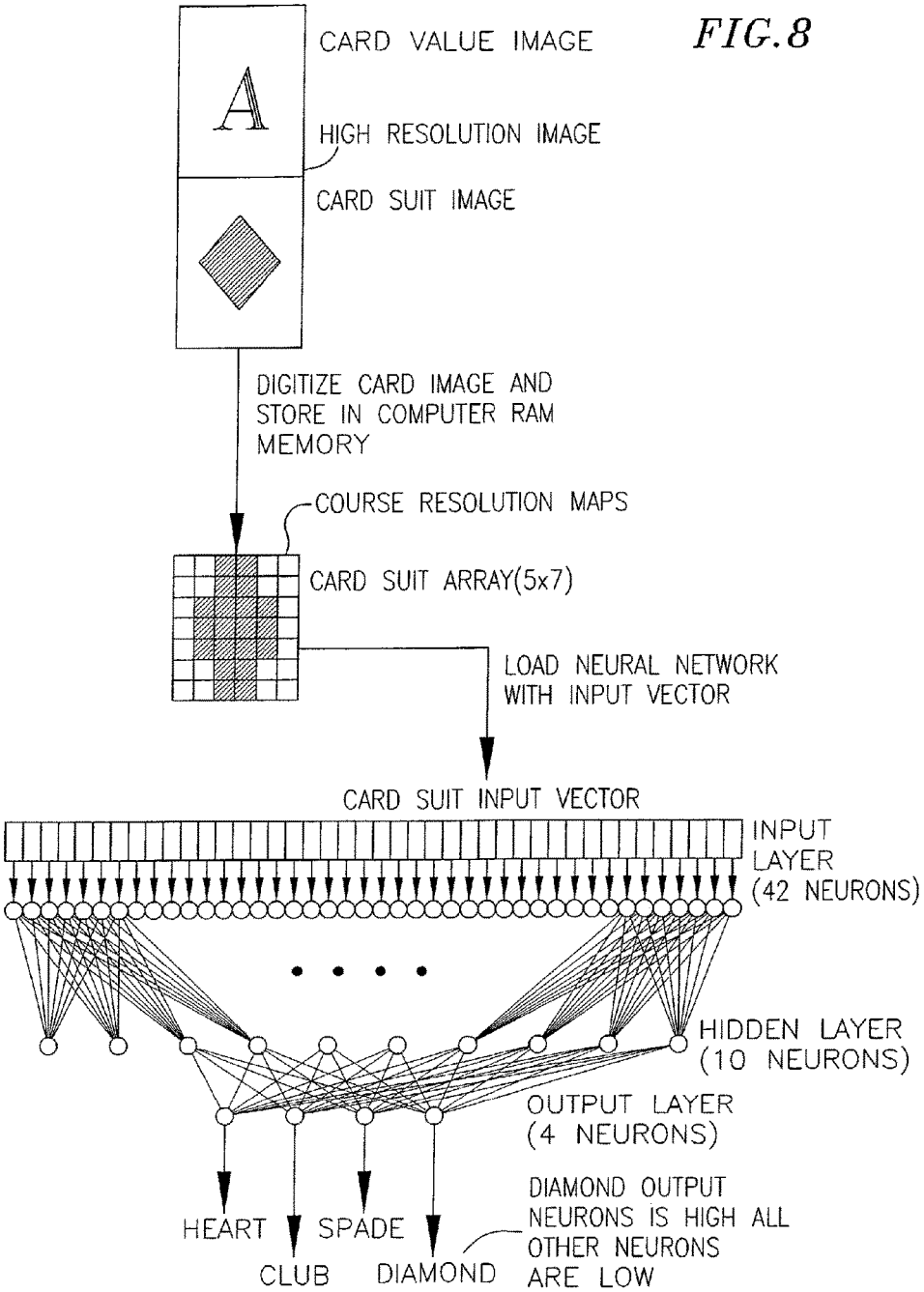
FIG. 8 is a schematic diagram for an exemplary feed forward neural network used to identify suit for a card dispensed from a card dispensing shoe with scanner, according to the present invention.
Figure 9:
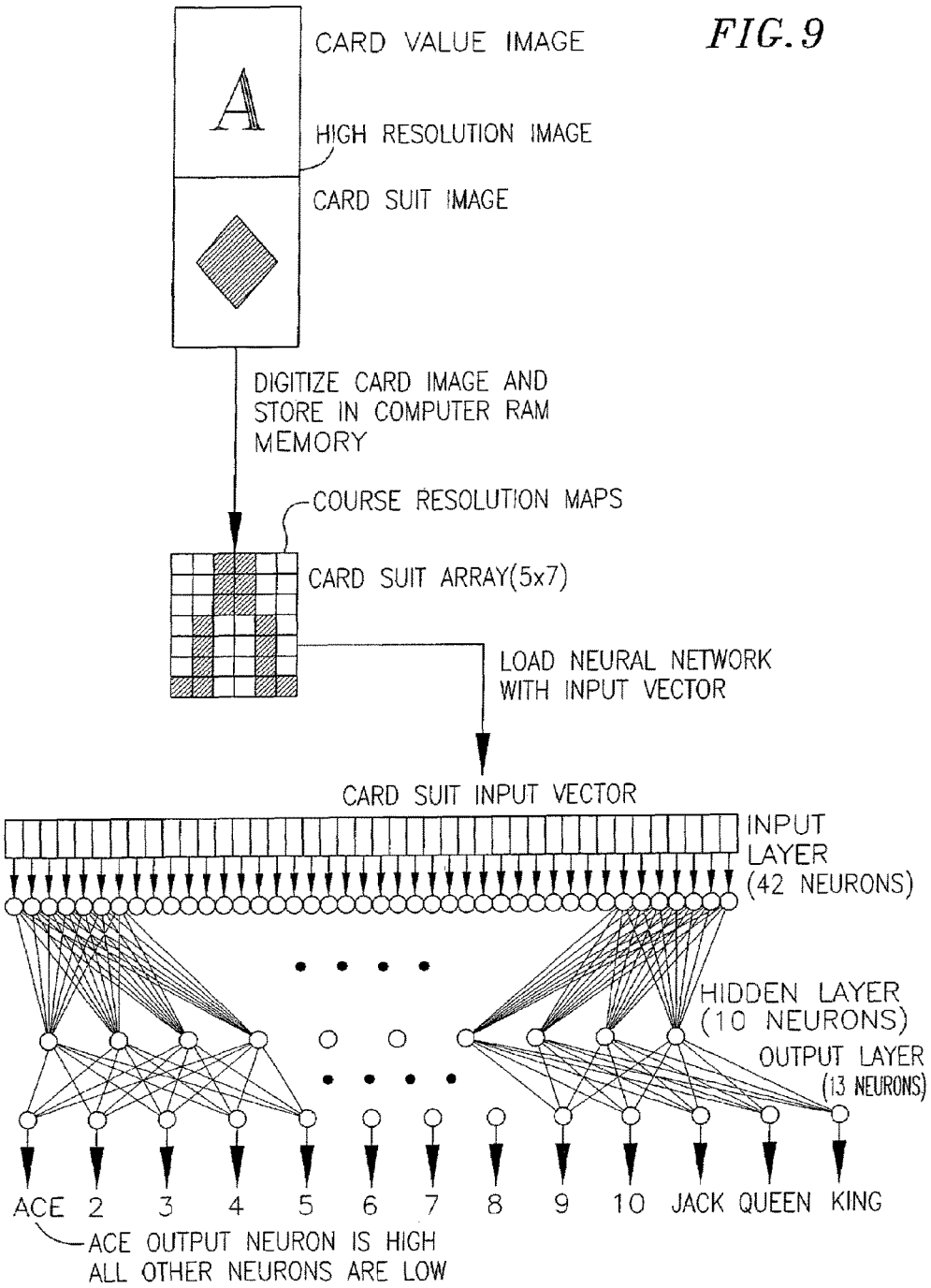
FIG. 9 is a schematic for an exemplary feed forward neural network used to identify value of a card dispensed from a card dispensing shoe with scanner, according to the present invention.

Referring to FIGS. 1, 2, and 4, shoe 10 includes an optical sensor or scanner 41 (sometimes referred to herein as OCR) that is adapted and positioned to scan and determine at least the value or value and suit for each card in deck 16 as the card is slid down and out chute 16A and out through slot 22 at the front of shoe 10. A lamp or other light source 42 preferably provides illumination for optical sensor 41, which sensor may be a charge mode 128×1 TSL 215 integrated opto-sensor made by Texas Instruments. An image of each playing card in deck 16 is scanned by optical sensor 41, and the scanner image data is preferably coupled to a computer system implementing neural network or other software mechanism for card identification. A neural network, such as depicted in FIGS. 7, 8, and 9 preferably is trained to recognize and identify the value or value and suit for each card from deck 16 that is scanned by optical sensor 41.

Of course other scanners for recognizing and identifying each card could instead be used. For example, the cards of the inventory of the shuffled decks(s) could be scanned with an optical reader or scanner prior to loading into the shoe to acquire the data representing each card value (and suit where desired) and the sequence of the inventory. A back-up or secondary scanner 41 could be disposed as described above to confirm identity and sequence as delivered. Other means may be used to confirm identity and sequence such as the dealer inputting data from time-to-time of the card delivered so that the proper sequence can be confirmed or an error detected and so the cards delivered to each hand of play can be identified and scanner data signals generated.

Figures 10, 11:
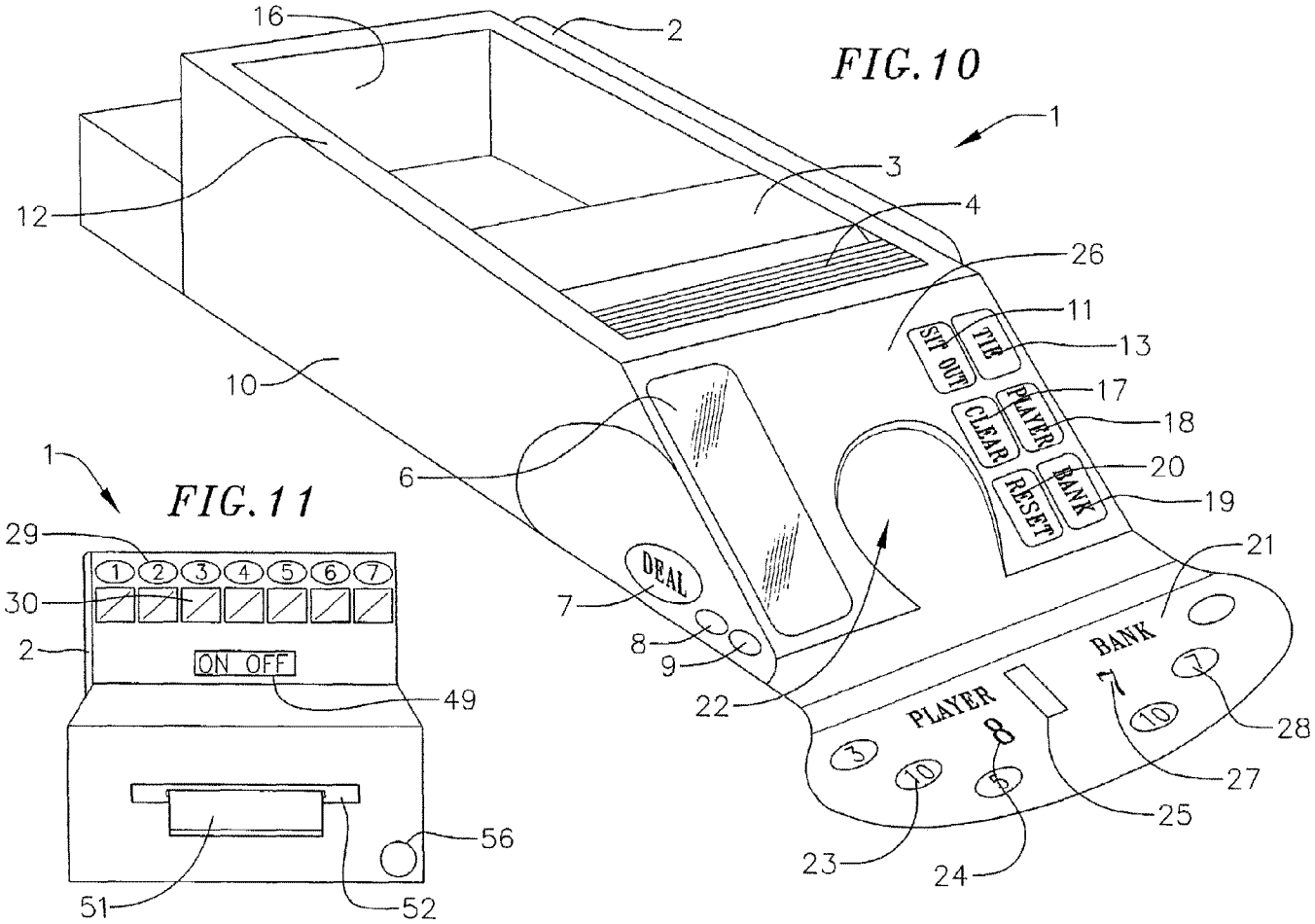
FIG. 10 is a side, perspective view of a second embodiment of a card dispensing shoe with scanner showing alternative data input keyboards and displays, according to the present invention.
FIG. 11 is a rear elevational view of the embodiment shown in FIG. 10, according to the present invention.
Figures 15, 16:
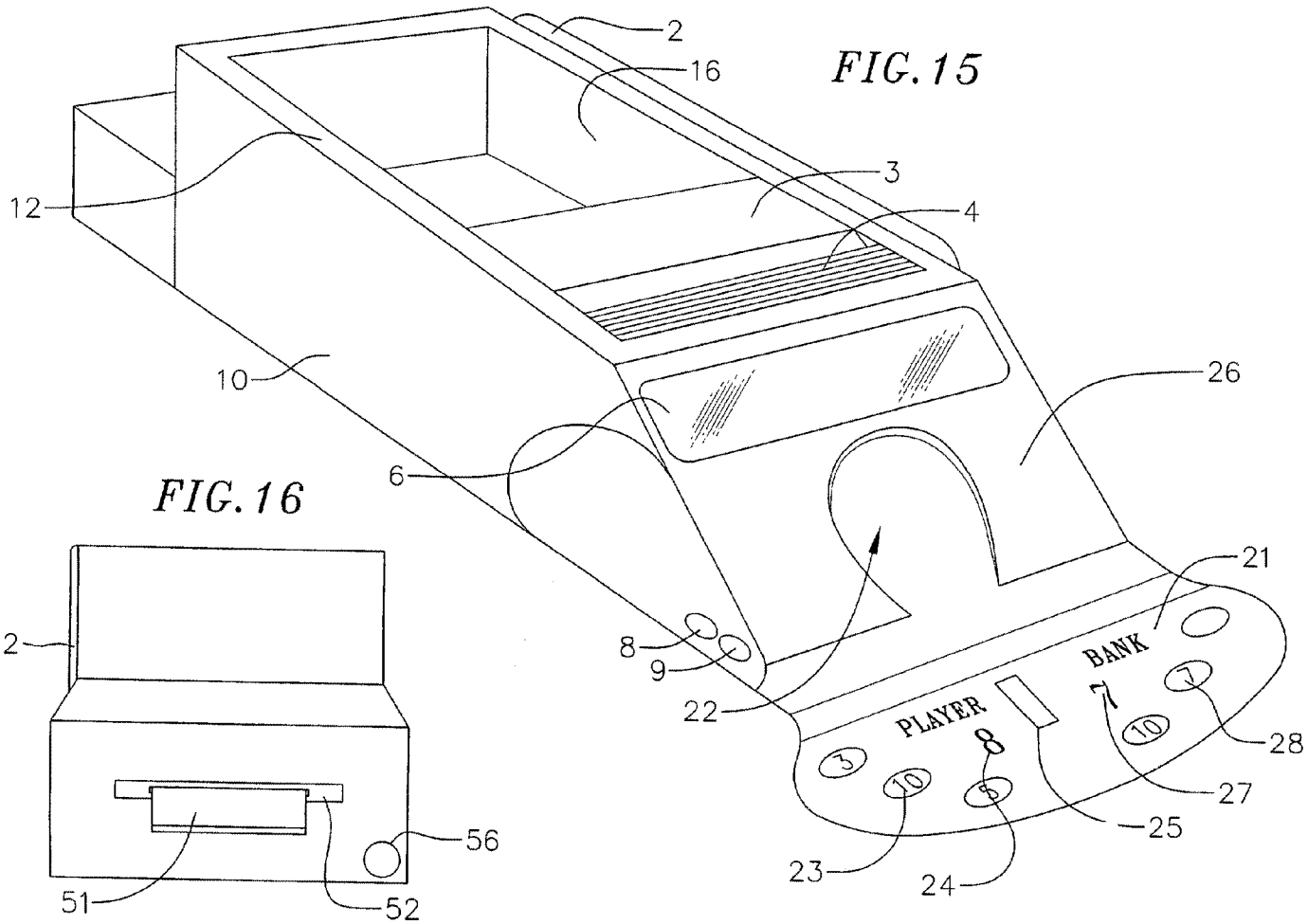
FIG. 15 is a front perspective view of the alternative embodiment of FIG. 10, according to the present invention.
FIG. 16 is a rear view of the alternative embodiment of FIG. 15, according to the present invention.
Figure 17:
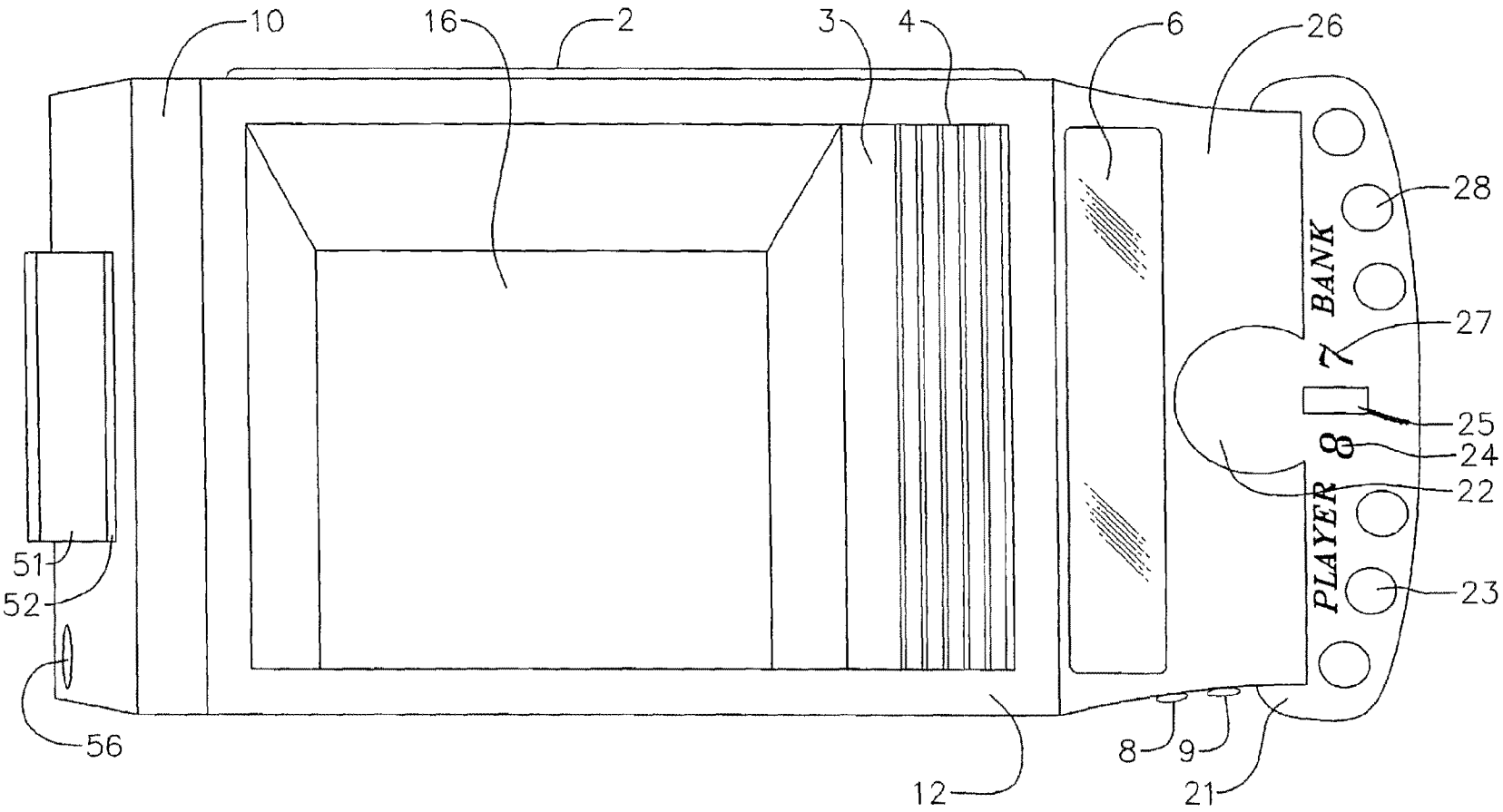
FIG. 17 is a top view of the card chute cover for the embodiment of FIG. 15, according to the present invention.
Figure 18:
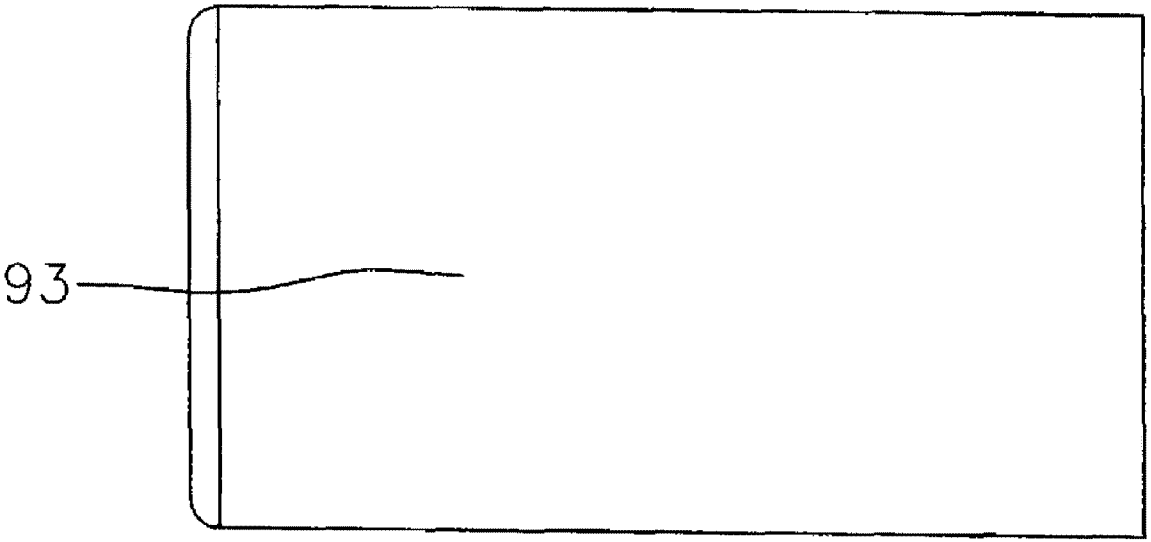
FIG. 18 is a top view of a card chute cover for the embodiment of FIG. 15, according to the present invention.

As shown in FIG. 1, shoe 10 can be sized to hold more than one deck 16 of playing cards, with between one and eight being a typical number of card decks retained within the shoe. As best seen in FIGS. 17 and 18, a removable cover 93 preferably can be attached to the top of the shoe 10 so as to cover the top of card chute 16A (FIGS. 10, 15, 17) to guard against any unauthorized insertion, exposure, or removal of any card(s) positioned in card chute 16. In a preferred embodiment, each card deck is placed face down into the open top of the shoe 10, for example on a 450 card chute 16 that slopes forward. As shown in FIGS. 10 and 15, a hollow wedge-shaped block housing 3 attached to a heavy stainless steel roller (not shown) spans the full width of chute 16 is placed behind the card decks to force the cards forward down card chute 16 and flush against a retainer wall 26. Thus, when a card deck is placed into forward slanting card chute 16, wedged housing 3 is placed at the rear of the deck to force the deck of cards forward against retaining wall 26, as the cards are removed one-by-one through card outlet 22 formed in the retaining wall. See FIGS. 3, 4, 10, 12, 15, and 17. The card deck 4 (FIG. 10) is placed in chute 16 on edge with the card backs facing the mouth of the shoe. Wedged housing 3 forces the top card of the deck 4 flush against the retaining wall 26 positioned at the front of the shoe 10.

The top card in the card decks placed in chute 16 is held flush against retainer 26 with a portion of its back exposed at the slot 22 in the shoe 10. Slot 22 may, but need not be, covered by a door or brush (not shown) located in the slot. Referring to FIGS. 1, 2, and 4, a start frame sensor 65 is shown disposed above and to the far right of optical sensor 41. As best seen in FIG. 4, a stop frame sensor 40 is disposed in slot 22, below and to the far right of the optical sensor 41. Referring to FIGS. 1, 3, and 4, shoe 10 also includes a game-round, start button 63, and a deck 4 load switch 32. Preferably located adjacent to the game-round, start button 63 is a deck penetration alert indicator 47 (e.g., an LED or light), as shown in FIGS. 1, 2, 3 and 4.

As further shown in FIG. 1, shoe 10 preferably includes a magnetic card reader 50 with a slot 52, see also FIGS. 1, 3, 11, 12, 16, and 17, for use with a player-tracking-card 51 (see FIGS. 1, 3, 11, 12, 16, and 17). A main power cable 56 brings operating voltage to shoe 10, and a Local Area Network (LAN) port 45 can expand connectivity with the shoe, see FIG. 6.

Figure 12:
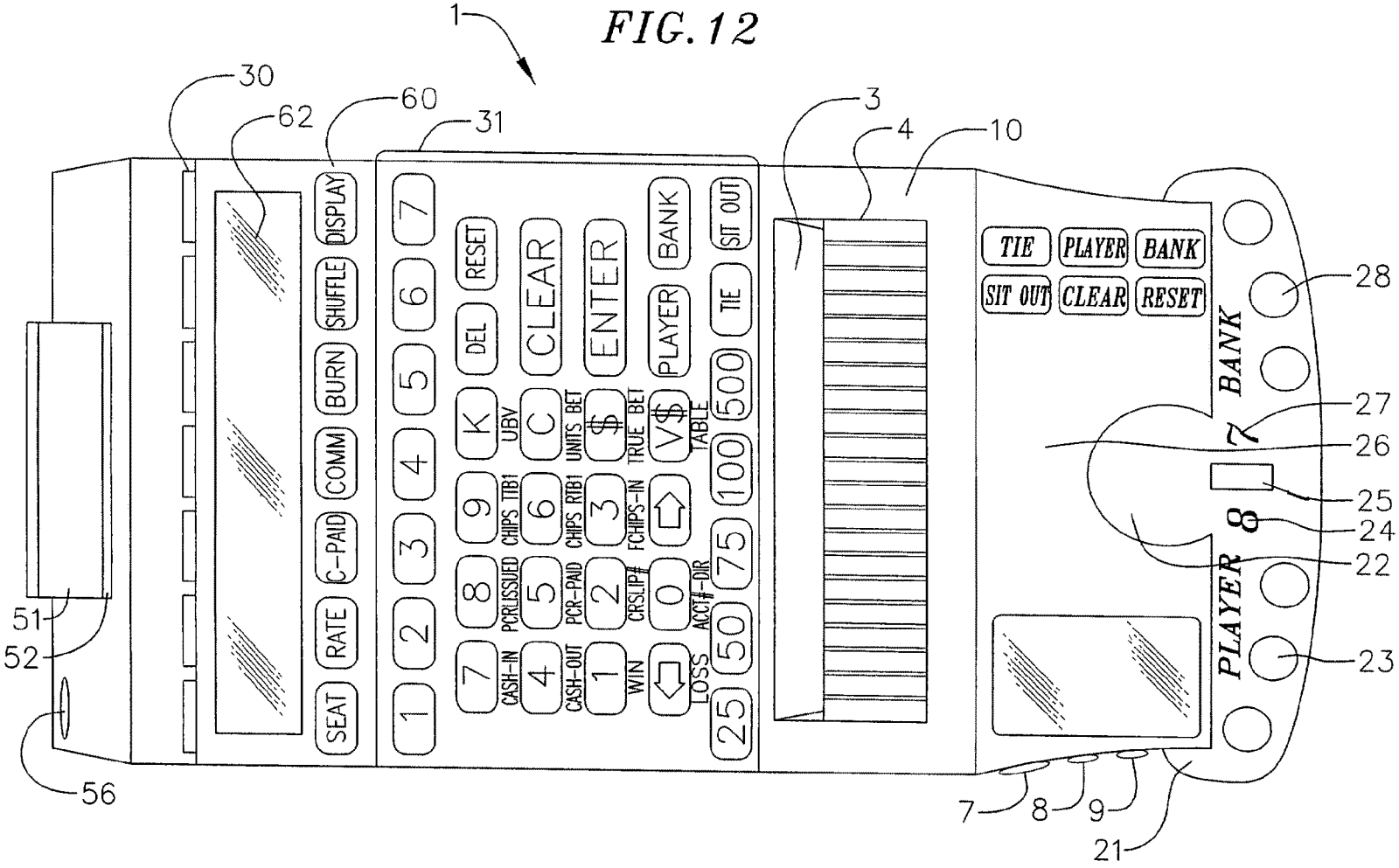
FIG. 12 is a top view of the embodiment shown in FIG. 10, according to the present invention.
Figure 13:
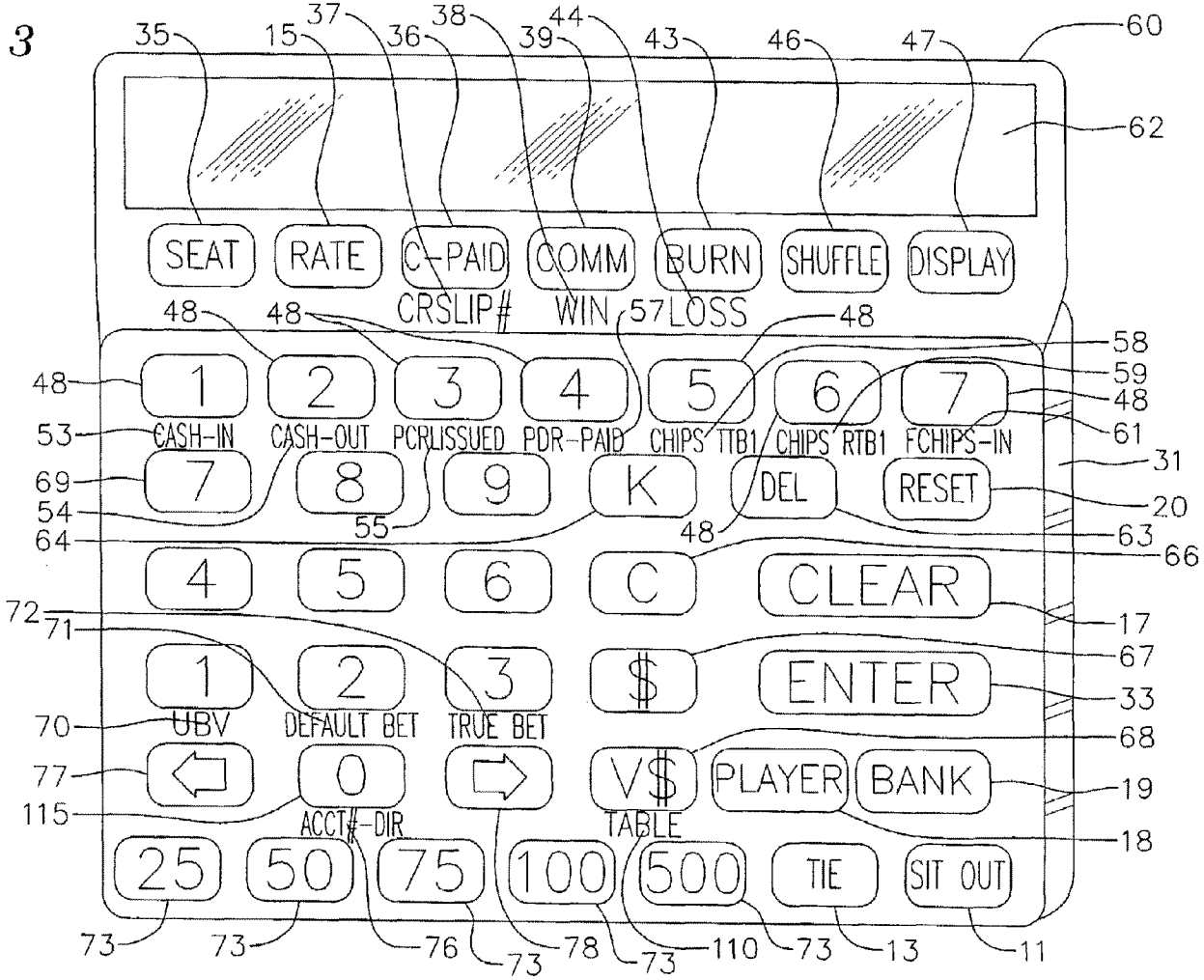
FIG. 13 is a top view of an keyboard with embedded game and data entry mechanisms, displays, and indicators, according to an embodiment of the present invention.

As shown in FIGS. 1, 3, 12, and 13, shoe 10 preferably includes a display 62, for example a liquid crystal display (LCD) and includes at least one alpha-numeric input device, such as a keyboard 60. FIG. 13 depicts exemplary details of the layout for keyboard 60 and LCD display 62, although other layout configurations may instead be used.

In the embodiment of FIGS. 10, 15, and 17, the front portion of shoe 10 includes an LCD 6 and a display 21, e.g., a segmented LED, (Light-Emitting Diode) display 21, see also FIG. 12. Exemplary layout details for segmented LED display 21 are shown in FIGS. 10, 12, 15 and 17. A display 11, e.g., a segmented LED may also be disposed elsewhere on shoe 10, for example on a rear portion as shown in FIGS. 11, 12, 15, and 17. Details of an exemplary layout for display 11 are shown in FIG. 11. An additional LCD 2 may also be disposed on shoe 10, for example on the left side as shown in FIGS. 10, 11, 15, 16 and 17.

Figure 5:
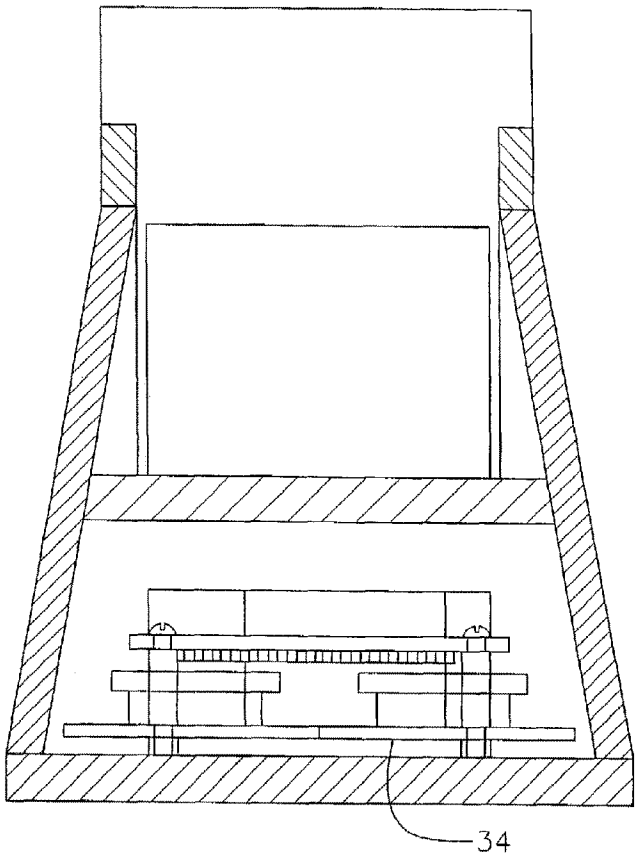
FIG. 5 is a front vertical section of the shoe of FIG. 3, taken along line 5-5, according to the present invention.

As shown in FIGS. 1 and 5, a central processing unit (CPU) system 34 is contained within shoe 10, for example within a region beneath the card chute near the shoe base of the shoe 10. If desired, bottom portion 14 of shoe 10 may be transparent to allow visual inspection of internal components, see FIGS. 1 and 4. Referring to FIG. 6, CPU system 34 preferably is coupled to and interacts with optical sensor 41 via an analog/digital A/D converter 76, with start frame sensor 65, with stop frame sensor 40, with game-round, start button 63, with load switch 32, with deck penetration light 47, with magnetic card reader 50, with LCD display) keyboard display 62, and with alpha-numeric keyboard 60.

Additionally, CPU 34 can also be coupled to a host computer 74, e.g., via LAN port 45. The term "host computer" is used in a generic sense, and may include a single computer coupled to CPU system 34 via standard LAN technology, or a computer network comprising several network servers. For example in the embodiment of FIG. 23A, a server system 147 can enable CPU system 34 to communicate over various media including the internet with many remotely located persons and systems.

CPU 34 processes input/output data to and from the keyboards, LCD displays and other components with the hardware associated with the present invention. CPU 34 operation can be controlled and monitored by software including custom designed software. CPU 34 may call the software from an attached storage unit, perhaps a hard drive (not shown), or if coupled to a LAN system may call the software from the LAN servers or host computer 74.

Shoe 10 with associated components including scanner 41 collectively retain at least one deck of cards, from which cards are dispensed one-at-a-time such that each card's value, rank, suit, and the sequence of dispensing is noted (e.g., using scanner 41) and can be recorded (e.g., in memory associated with CPU system 34). Further the game player recipient or seat number for each dispensed card can also be noted and recorded. Displays associated with shoe 10 (or mounted on or in the game table) can show each hand score, in real time, and can be used to show a running history of each player's bets and bet outcomes, hand-by-hand. Capturing such information, which can also be coupled to remote displays, can enable the game dealer(s) and host casino to better guard against human error and/or cheating, especially if the electronically displayed information does not match the game hands scores of the real cards spread face-up on the game table. If desired, such displays could also be used to promote the casino, e.g., to show advertisements, advertise special events, provide restaurant menus, room rates, and the like.

It will be appreciated that one advantage of the present invention is that game dealers and casino floor supervisors can rely upon the shoe to help combat human error and cheating, and can divert some of their attention to other matters. For example, dealers and supervisors can now more readily monitor game wagers, and can better input game and game player information into the host casino's database system, and can provide better customer service, all while speeding up progress of the card game and thus enhancing revenue to the host casino. The barrier locking embodiment of a shoe is especially useful in thus helping the game dealers and floor supervisors. Further, the many displays generated by the shoe and/or game table, according to the present invention, permits dealers and supervisors to cross-check between physical cards and wagering chips on the game table, and status on the various displays. A discrepancy between what the electronic system displays report and the physical cards and chips on the game table can rapidly be identified and investigated. The use of light sensors, magnetic sensors, metal sensors embedded within the top of the game table, according to the present invention, advantageously can sense the occurrence of and the type of wager (Player, Bank, Tie) made by which player for each game round played. The sensing of a bet within a betting box, e.g., betting boxes 86, 87, 88 as shown in FIGS. 14-19 is coupled from the sensor(s) to the CPU, e.g., CPU system 34, which can activate the relevant indicator light(s) embedded in the game table top and associated with and adjacent to the appropriate Player, Bank, Tie betting box assigned to each seat designation imprinted on the game table top layout. Similarly, when a wager is removed from a betting box, prior to the delivery of the first card for the current game round from the shoe a sensor embedded in the table top will sense the removal and the CPU system will accordingly extinguish the associated bet-type indicator light. In the event a wager is removed from a betting box after the delivery of the first card, for the current game round, from the shoe a sensor embedded in the table top will remain illuminated to alert the game dealer prior to and during the settlement of the game round that a bet has been illicitly removed from play.

In one embodiment, when the first card of the current game round is removed from the shoe, and passes over the OCR scanner, light sensors for all active seats will freeze to prevent any additional types of bets from being recorded. By "freeze" it is meant that all illuminated indicators will remain lit, and all indicators for seats having no wagers will remain dark until after the settlement for the current game round is completed. When the settlement is completed, the game dealer will reset the bet type sensors and the bet-type indicator lights using one or more keyboards carried by the shoe and/or embedded in the game table top.

The action of the bet type sensors and indicator lights will identify the type(s) of wager(s) placed in one or more of each game player's designated betting boxes 86, 87, 88 (see FIGS. 14-19) for an upcoming game round. As noted, security of the game is enhanced by enabling game dealers to visually confirm from the status of the various displays and/or indicator lights that game players have not, intentionally or otherwise, cheated. Confirmation can be made that a wager have not been removed, or relocated to a different type of betting box (perhaps Player to Bank) after delivery of the first card from the shoe for the current game round, in an attempt to alter the settlement of a specific wager for the current game round.

The status of the bet-type sensors and indicator lights can also identify wager types paced in one or more of each game player's designated betting boxes, for an upcoming game round. The status information is preferably combined with information from scanner 41 as to the top card value, whereupon CPU system 34 (or external CPU) can calculate each game players game advantage or disadvantage. A calculation is also made as to probability that the player had prior knowledge of the top card of the deck before it was removed from the shoe, e.g., for delivery as the first of the original two cards that would comprise the Player hand for each game round played. A player whose probability is sufficiently high to create a suspicion of cheating will be monitored very closely, or will be invited to leave the game. The game advantage or disadvantage information for each player is used to calculate the casino's Earning Potential from the player, and each player's Complimentary Equivalency, or the amount of complimentary expenditures the casino is willing to spend on the customer. Such information can be recorded by the dealer without diminishing loss of rounds-dealt-per-hour, and thus revenue per hour, as the enhanced security provided by the present invention relieves dealers from many tasks related to providing game security.

As noted, casinos commonly monitor and record game play using closed-circuit TV (CCTV) and video recordings. (Camera 135 in FIG. 23A could in fact include such a TV camera.) Such video observation can also be used to record the status of the various indicator lights and displays embedded in the game table during play. A video record will show the actual status, whereas a record of the CPU command signals to the various displays and indicators will show the intended status, e.g., perhaps an indicator light was defective. The defect (e.g., an indicator that should have been active but was not) would be visible in the video record.

Baccarat game players traditionally make a personal record, or keep score, of which hand won each game round, and which game rounds ended with Tie hands, in the order in which the game rounds are played. The players typically use a score card and pencil provided by the casino. It will be appreciated that the present invention electronically gathers the same (and more) information and can generate a score card common to all players, or the present invention can create a score card display (not shown), embedded in the game table top at each player's seat or position, that is unique to each individual player, showing the results for each Baccarat shoe dealt in that casino; and a running display of the results for each wager made by each individual player during the play of the current baccarat shoe. The electronic score card(s) further speeds up the game, thus enhancing casino revenues.

Figure 14:
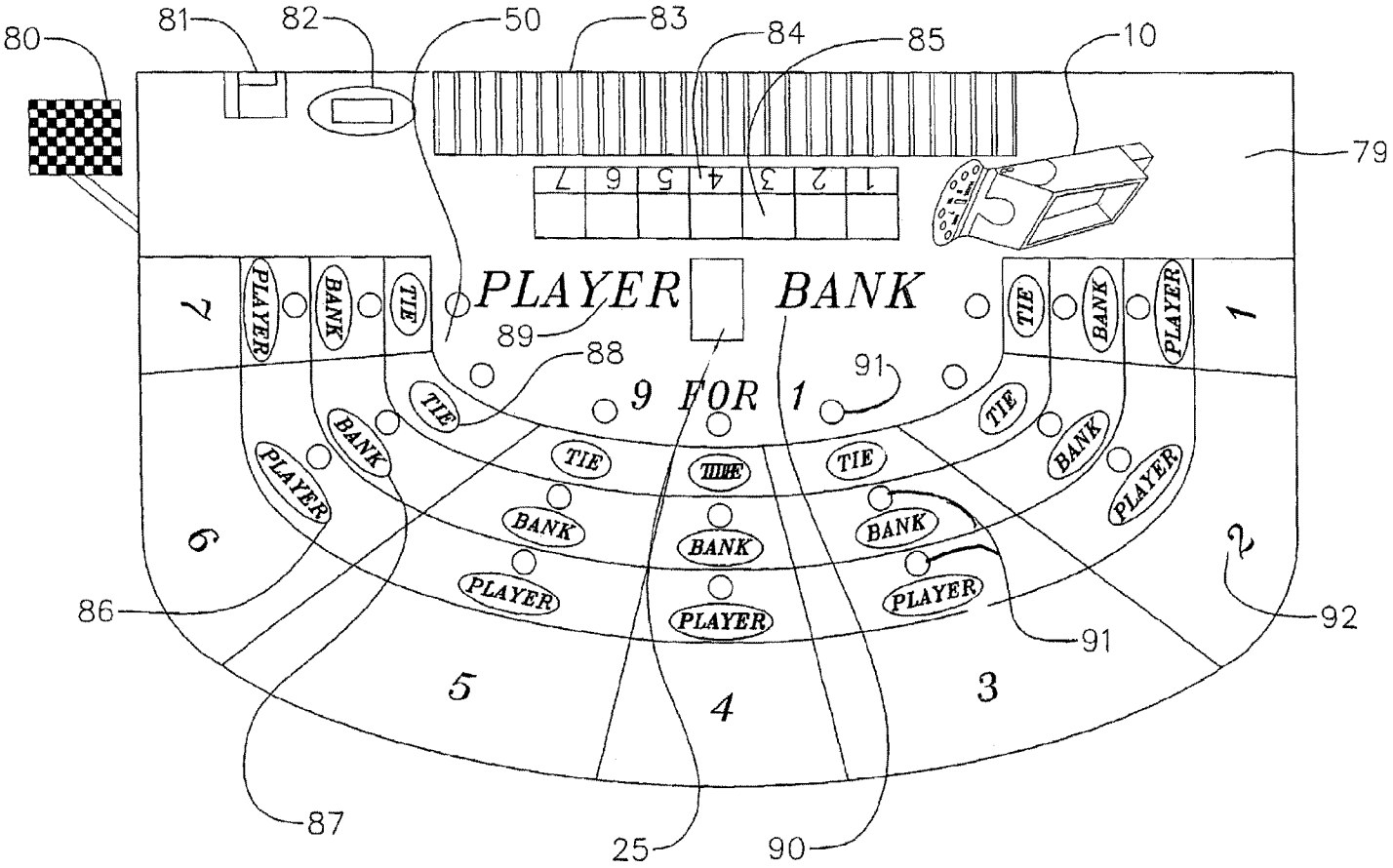
FIG. 14 is a top view of an exemplary mini-Baccarat game table embedded game and data entry mechanisms, displays, and indicators, according to an embodiment of the present invention.
Figure 19:
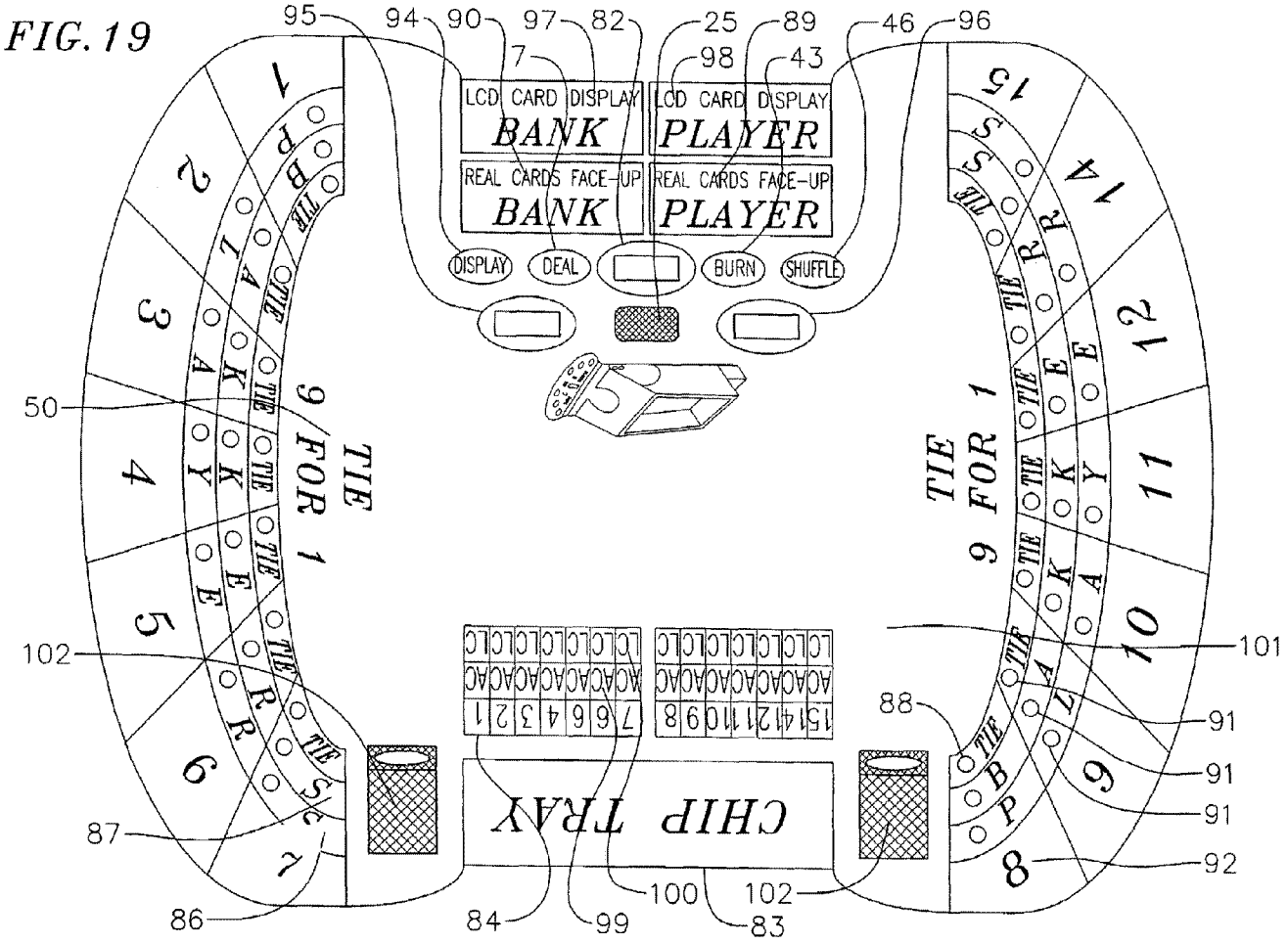
FIG. 19 is a top view of a conventional Baccarat game table depicting data entry and display mechanisms, according to the present invention.

In one embodiment, the present invention uses the keyboards and displays preferably embedded in the game table top to allow the game dealer to enter and retrieve the value and sum of each denomination of gaming chips contained in the game table chip tray 83, see FIGS. 14 and 19. Embedded sensors allow all game table debit and credit transactions, and the total of gaming chips comprising the starting and ending bankroll for the game table at the beginning and ending of each play and/or casino shift to be tracked in real time.

In one embodiment, the present invention is used with the Big-Baccarat table and the Mini-Baccarat table. The electronics associated with the Big-Baccarat game table includes a keyboard enabling the Caller to identify the Shuffle and Burn cards for the system, a Display key to illuminate the graphic card display, or LCD, preferably embedded in the game table top, and a Deal key to release the barrier locking device carried by the shoe when the Caller sees that there are to be no more bets for the upcoming game round, and a color coded please claim: Game Round Results indicator light 25 (FIGS. 10, 12, 14, 16, 17 & 19). Preferably when the game round ends in a Tie the Game Round Results indicator light will illuminate with the color Rose; and when the game round is won by the Player hand the Game Round Results indicator light will illuminate with the color Gold; and when the game round is won by the Bank hand the Game Round Results indicator light will illuminate with the color Blue. The overall system further includes two base dealer keyboards that can perform all functions or actions of the Caller's keyboard and that enable the Base dealers to enter all types of player rating and game information into the system, and includes type bet sensors such as light sensors, type bet indicator lights, and a preferably LCD display to display all commissions owed by all game players, and an individual LCD display (not shown) to display the commissions owed by a specific seat or game player, as well as an electronic score board common to all game players. The electronic system for the Mini-Baccarat game table will include type bet sensors, type bet indicator lights and a color coded game round results indicator (tricolored light emitting diode) light, an individual LCD display (not shown) to display the commissions owed by a specific seat or game player, and an electronic score board common to all game players. Commissions are automatically calculated by the present invention at the end of each game round. Should a game player terminate his/her play without the dealer collecting any commissions due, such adverse information can be added to this player's permanent file in the casino's database. A record of all such lost commissions is thus also available to the casino for tax write-off purposes.

If desired, two types of card dispensing shoes according to the present invention may be used. A shoe used to deal a Big-Baccarat game will preferably include the scanner, the magnetic card reader, the locking barrier mechanisms, a message or advertisement display board, and an optional game round results display to show card value, card suit, card rank, sequence dealt, numeric score for Player and Bank, and a color coded game round results indicator light 25. This shoe and the game table 79 (FIGS. 14) and 101 (FIG. 19) to which the shoe may be coupled would also preferably include a color coded Game Round Results indicator light 25 (FIGS. 10, 12, 14, 15, 17, & 19), but it need not include a keyboard. Preferably the Big-Baccarat shoe is battery powered and includes a wireless communications mechanism to communicate with the rest of the system. A wireless shoe can more readily be passed among the game players, without being restricted to use in one location. A Mini-Baccarat shoe may be hardwired or wireless, and preferably will include the OCR, the magnetic stripe reader, the locking barrier mechanism, a message or advertisement display board, a segmented display for the game round results (card value, card suit, card rank, sequence dealt, numeric score for Player and Bank), a color coded winning hand display, an optional rear segmented display, and at least one keypad.

As noted, the game of Baccarat is characterized by very high stakes, and the game players are given wide latitude in handling game cards and in revealing game cards to other players and to the dealer(s). Often game players engage in theatrics when handling a game hand, which conduct is part of the allure for Big-Baccarat games. But unfortunately, opportunity for human error and/or cheating during such theatrics and card handling exists.

Optical scanner 41 and CPU system 34 software associated with shoe 10 immediately know the card value, card rank, card suit, the sequence in which each of the cards was removed from the shoe, and the hand or seat to which it was designated for delivery, and the score of the hands comprising the game round. The present invention provides the option of immediately displaying such information.

When playing at a standard Baccarat game table it is preferable to delay the display of the game card values and the resulting Player and Bank hand scores until the game players have exposed the Player and Bank hands, or they have been turned face-up, on the game table top, by the Caller or game dealer(s). This delay tends to maintain the mystique and suspense of the game, much to the exhibitionists delight.

When playing at a Midi Baccarat game table, a Midi Baccarat game table is similar to Mini Baccarat game tables, however the Midi Baccarat game players often handle the game cards and the table limits are normally higher than table limits on Mini-Baccarat games. Therefore, it is preferable to delay the display of the game card values and the resulting Player and Bank hand scores until the game players have exposed the Player and Bank hands, or they have been turned face-up, on the game table top, by the Caller or game dealer(s).

When playing at a Mini Baccarat game table, usually only the game dealer handles the cards during the course of the play of the game. The game hands are turned face-up by the dealer(s) without any fanfare. When playing Mini-Baccarat[.], it is preferable to display the game card values and the resulting Player and Bank hand scores immediately on the removal of the fourth card from the shoe, which is delivered to the Bank hand. The value of any third cards dealt to a hand will also be displayed immediately on their removal from the shoe.

B. Card Dispensing Shoe with Scanner: Alternate Embodiment

Another embodiment a card dispensing shoe with scanner and related systems, according to the present invention, is shown as element 1 in FIGS. 10, 11 and 12. Referring to FIG. 10, in this embodiment a CPU (such as CPU 34 in FIGS. 1, 5 and 6) may be internal or external to shoe 1. An external CPU may be custom designed or an off-the-shelf CPU, and can be coupled to the shoe via an Input/Output Port (I/O Port) 6, as shown in FIG. 11. This port in turn can couple the external CPU to components of the shoe as sub-systems or function blocks, as previously described. Also similar to what has been described regarding other embodiments, this embodiment may also have a CPU (internal or external) coupled to a LAN and/or WAN network and/or server system. As noted, remotely located devices such as keyboards and monitors may also be coupled to the system, for example to allow remotely located supervisors to monitor and enter information pertaining to a game in play.

In the embodiment under discussion, keyboard 60 and keyboard LCD display 62 shown at the rear of shoe 10 in FIGS. 1 and 3 in the first embodiment have been removed and replaced with expanded function keyboards and LCD displays as will now be described. These expanded keyboards and LCD displays enable more diverse functions to be performed with the present invention.

Referring to FIGS. 11 and 12, the expanded function keyboards and LCD displays include keyboard 11 and rear segmented LCD display 2, LCD display 3 of shoe 1, front segmented display 22 of shoe 1, and LCD display 24 of shoe 1. As noted, the additional keyboards and LCD displays are coupled to either an internal or an external CPU (not shown).

Figure 20:
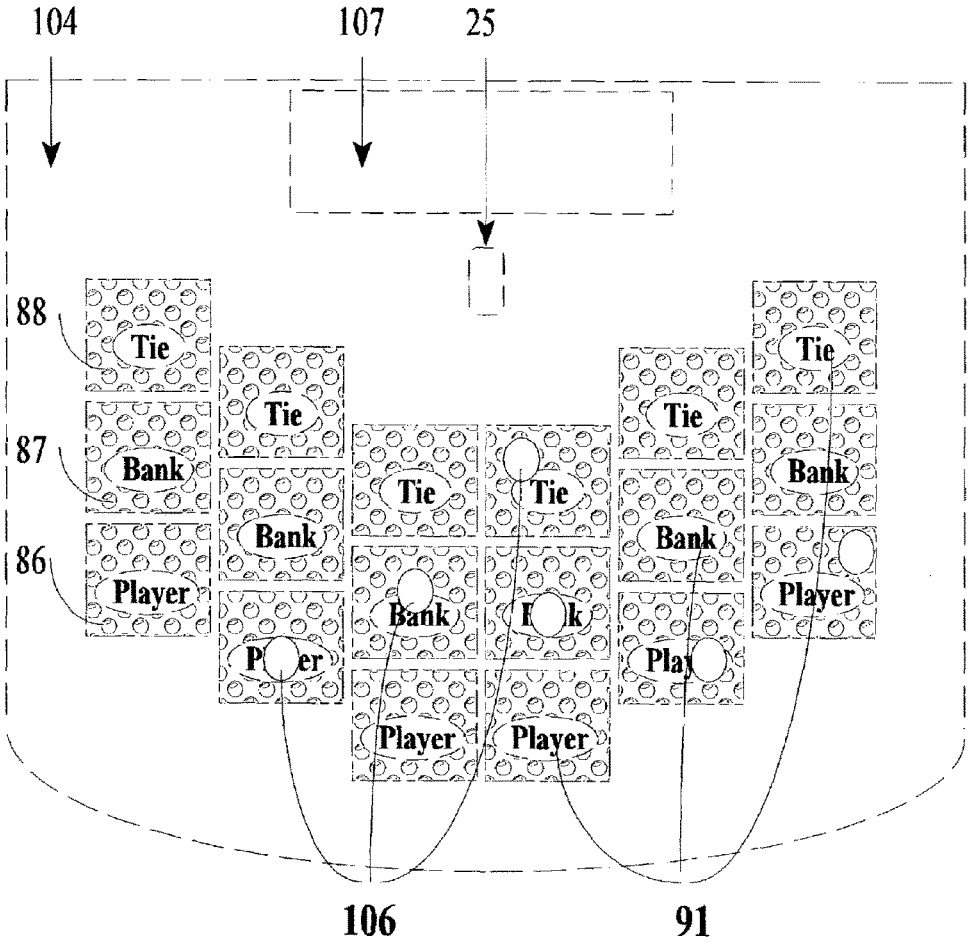
FIG. 20 is a cut-away top view of a Baccarat game table top showing light sensors and indicators, according to the present invention.
Figure 21:
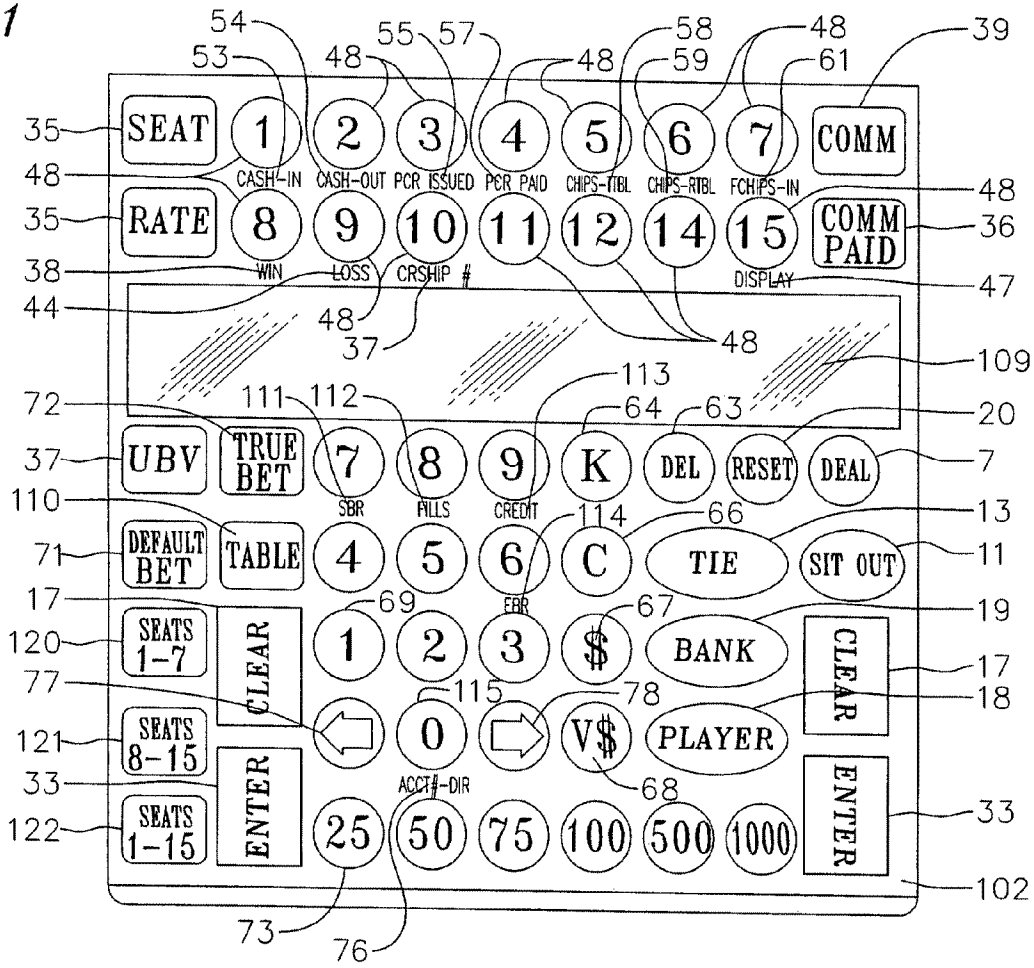
FIG. 21 is a top view of an exemplary keyboard with data entry mechanisms, displays, and indicators, embedded in the Baccarat game table top of FIG. 19, according to an embodiment of the present invention.

As noted, a player-tracking-card 51 may be inserted into the magnetic card reader 50. In the present configuration, the game-round start button 63 is repositioned as the deal button 7 (FIGS. 10, 12, 19 and 21), and is part of keyboard 102 as shown in FIG. 21 as the Deal key 7. Also shown in game table top 104 in FIG. 20 are light sensors 91 for Player, Bank, and Tie bets, in which 106 denotes bets positioned over these light sensors. A cut-out 107 is preferably includes to receive a chip tray. Also shown in FIG. 20 are bet-type light sensors 86, 87 and 88 for bet type identification. In a preferred configuration, penetration light 47 from the configuration of FIGS. 1, 2, 3, and 4 is replaced with the first indicator light 9 (see FIGS. 10, 12, 15 and 17) and with the second indicator light 8 at the forward end of a side of shoe 1, see FIGS. 10, 12, 15, and 17. If desired, a generic 101-key keyboard may be coupled to the internal or external CPU used with shoe 1, and can be used with keyboard 60 (see FIGS. 1, 3, 6, 12, and 13). As described elsewhere herein, the CPU can be operatively coupled to work with software available on other computers, including LAN and/or WAN servers, and host computer(s).

C. Operation

1. Overview

A card dispensing shoe with scanner, baccarat game table apparatus, system and method according to the present invention includes a software program designed to evaluate the betting skills of casino Baccarat game players, to calculate each player's game betting advantage or disadvantage, to calculate the probability that each game player may have (illicit) prior knowledge of the value of top-card-of-the-deck before that card is removed and dealt as the first card of the Player, side, or hand. Further calculations include the amount of commissions owed by each game player having placed a winning wager on the Bank side or hand, each game player's earning potential and complimentary equivalency based, in addition to a casino's traditional Theoretical Win or projected advantage over the game players, each individual Baccarat game player's game betting advantage or disadvantage over the house or casino when playing against a specific number of decks and a specific set of rules. In addition, the present invention can enter and retrieve all types of player rating and game table bankroll information relevant to each game player and each game table. Further, the present invention can automatically generate, record, store, and allow the retrieval of statistical information relative to the game dealer(s). In several embodiments, information relating to what bets have been made by what players is visually displayed such that the casino dealer can rapidly compare the displayed information with physical cards and chips on the table to cross-check for any discrepancies, due perhaps to cheating or error by player(s).

During the play of the game the game dealer(s) using one or more keyboards coupled to the card dispensing shoe and/or baccarat game table to enter the amount of wager made by each game player for all types of game wagers. Bet sensors could also be employed.

A betting matrix is preprogrammed into the software used by the present invention to identify the game betting advantage or disadvantage criteria a Baccarat game player has when every type of wager(s) made by a Baccarat game player conforms to the value of the first card dealt from the shoe to the Player hand during each-game-round. In the event one or more game [player's] *players* have prior knowledge of the first card to be dealt from the shoe to the Player hand for each game round, and the game players use this information to determine the type of wager (that will have the statistical first card advantage) to make for the upcoming game round to obtain a game betting advantage for the game round played, the systems software program will calculate each game player's real time game betting advantage or disadvantage. Each game Player's type wagers information can also be used by the CPU to calculate the probability that a player has prior knowledge of the top card of the deck(s) carried by the shoe before that card is dealt as the first of the two cards that will comprise the Player hand for all upcoming game rounds played. The computer is programmed to compare the real time wagers made by each of the game players on one or more types of wagers offered to Baccarat game players at the beginning of each game round to determine each of the game players real time betting advantage or disadvantage for each and all game rounds played.

Each game Player's type wager(s) information can also be used by the CPU to calculate the probability that a player has prior knowledge of the top card of the deck(s) carried by the shoe before that card is dealt as the first of the two cards that will comprise the Player hand for all upcoming game rounds played.

When a Baccarat game round has ended the computer program knows the factors required to determine each game players game betting advantage or disadvantage, i.e. the value of the top-card-of-the-deck that is designated to be delivered as the first card of the Player side or hands original two card hand, the type and the amount of the wager(s) made by each game player. Using this information, the CPU and software will calculate and display each game player's real time game betting advantage or disadvantage for all game rounds played, and the statistical probability that any one of the game players has a prior knowledge of the top-card-of-the-deck before it is removed from the shoe and delivered as the first of two cards to be delivered to the Player hand for the upcoming game round.

D. Card Dispensing Shoe with Scanner, Baccarat Game Table Apparatus, System and Method:

1. Basic Embodiment Operation

Operation of a Card Dispensing Shoe with Scanner, Baccarat Game Table Apparatus, System and Method (FIGS. 1-6) Basic Embodiment operation will now be described. The dealer operates shoe 10 (e.g., FIG. 10) in the typical fashion of shoes used in card games. Referring to FIG. 12, preferably keyboard 60 is attached to the shoe 10 by means of a hinge 31 (FIG. 10). To place a desired number of decks in shoe 10, keyboard 60 is raised by the game dealer from its seated position over the card chute 16 and swung up and back, toward the outside wall of the shoe housing. As noted, typically between one and eight decks of cards will be placed in shoe 10, each deck being placed edge down into open chute 16. Chute 16 preferably slopes forward at approximately 45°, and a hollow wedge-shaped block housing 3 mounted on a heavy stainless steel roller (not shown)

provides the force required to push the cards forward down the chute 16. As shown in FIG. 10, the cards are held there flush against retainer 26, ready to be pushed through the card outlet 22 of shoe 10 by the dealer.

When the deck(s) of playing cards 4 (FIGS. 10, 12, 15 and 17) have been placed in the card chute 16, and the hollow wedge-shaped block housing 3 is placed behind the deck, the dealer lowers the raised keyboard 60 over the card chute 16 where the keyboard 60 is supported by hinge 31 to the shoe housing, see FIG. 12.

To deal the cards, the dealer will manually remove a single card from the shoe 10 by pushing a door (not shown) covering the card outlet 22 out of the way, or by reaching through a brush (not shown) that prevents players from viewing the back of the next playing card and possibly seeing any identifying marks on the playing cards. Then the dealer pushes the next card down and out of the opening of the card outlet 22 by pressing downwardly on the top card of the deck in the shoe. This forces the top card through the card outlet 22 and onto a playing surface of a game table such as shown in FIGS. 14 and 19. In this manner, cards are dealt to the players in the card game.

Imprinted on the game table layout 50 (FIGS. 14 and 19) at each player position is a number 92 (FIGS. 14 & 15) designating a seat number for that position at the game table. The area immediately surrounding the seat number 92 is used by the player to place his/her chips not in play or other personal items.

Figure 22:
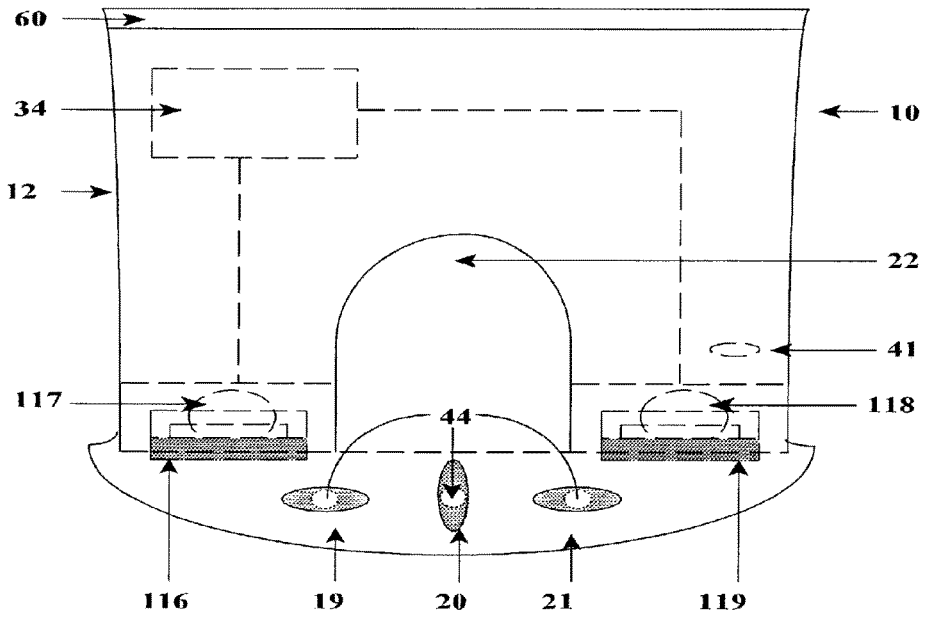
[FIG.22]

Shoe 10 also includes a deal button 7 that is pressed to record the start of a particular game round of cards to be dealt from the deck, and to release the card barriers 116 and 119 in the locking embodiment of FIG. 22. In the event the deal button 7 is pressed after the game round has commenced (i.e. a medical emergency or distraction occurs jeopardizing the security of the game) the card barriers 116 and 119 will raise to a blocking position preventing any additional card from being removed from the deck. When the threatening situation is resolved the game dealer will again press the deal button 7 to lower the card barriers 116 and 119 to allow dispensing of the game hands to resume. Referring to FIGS. 10, 12, 15, and 17, shoe 10 also includes a next to last round indicator light 9 that preferably is yellow when[.] illuminated, and is turned on by the software operating the CPU. The illumination will notify the dealer that the number of cards remaining in the shoe will allow only two more game rounds to be dealt before shuffling the playing cards and reloading the shoe. As shown in FIGS. 10, 12, 15 and 17, a last round indicator light 8, carried by shoe 10, is preferably red when illuminated and is turned on by the software operating the CPU (not shown) to notify the dealer that the number of cards remaining in the shoe will allow only one more game round to be dealt from the shoe 10 before shuffling the playing cards and reloading the shoe.

At the end of each game round, the software installed on the CPU (not shown) will identify, according to the game rules, when the last card of the game round has been dealt to the Player or Bank hand. The software will then automatically raise and lock card barrier mechanisms 116 and 119 (see FIG. 22) to prevent exposure or removal of any additional game cards from the shoe. Locking will continue until the game dealer presses deal button 7 to unlock and lower the card barriers. When the deal button 7 is pressed all active seats identified as having no bets placed for the upcoming game round will be automatically designated by the system as Sit Out seats[.] (the game player remaining at the game table but choosing to sit out and not make a wager for the upcoming game round). As an alternative, the card barriers may be lowered by the system software automatically when the system bet-type sensors signal that a bet has been placed for all active seats or game players.

Referring to FIGS. 14, 19 and 20, when a bet is placed over the bet-type sensors 86, 87 & 88 embedded in the game table top beneath the imprinted layout 50 (FIGS. 14 and 19) when the first card of a game round is removed from the shoe 10 for delivery to the Player hand the bet-type sensors 86, 87 & 88, having illuminated the respective bet-type indicator lights 91, will freeze. When the settlement for the most recent game round has been completed, the dealer will press the reset key 20 (FIG. 21) to unfreeze the bet-type sensors 86, 87 & 88 and to darken the bet-type indicator lights 91. So doing will allow the bet-type bet indicator lights 91 to respond, illuminate or go dark, to the placement or removal of a bet from over the bet-type sensors 86, 87, 88 positioned beneath the game table top layout 50 directly beneath each of the imprinted areas designated to receive Player, Bank or Tie wagers, when one or bet sensors 86, 87 and 89 have detected that at least one type of wager 106 has been made by a designated seat or game player for the upcoming game round.

When the game dealer presses the deal button 7 to release card barriers 116 and 119 of the locking device to signal the start of the upcoming game round, game cards can be dealt from shoe 10. When the first card dealt from the shoe for the upcoming game round passes over optical sensor 41, preferably all bet-type sensors and illuminated type bet indicator lights 91 will freeze. When the illuminated bet type indicator lights are frozen, any removal from or placement of a bet-type over one or more light sensors 86, 87, and 89 will be ignored by the light sensors 86, 87 and 89. The object here is to provide the game dealer with a visual way to identify the type of bets the system has identified each seat or game player as having made before the passing of the first card of the current game round over the shoe's optical sensor 41.

Referring to FIGS. 1, 2 and 4, as each playing card is pushed down the chute 16 and out the opening of the card slot outlet 22, each card will come into physical contact with a start frame sensor 65, which results in the activation of the shoe 10 optical sensor 41. The face of each card is illuminated with a bulb 42 to allow scanning by optical sensor 41. As noted with respect to FIGS. 7, 8, and 9, optical sensor 41 is preferably coupled to a neural network that has been trained to recognize the images printed on the face of the cards as they pass from the chute 16 through slot 22, and over or past optical sensor 41.

It should be noted that scanning need [nit] *not* be done via card recognition using a neural network approach. While using a neural network system is preferred so that standard decks of cards may be used, it should be noted that the cards may carry marks or embedded devices or structures or "[indica] *indicia*" so that the value, and if required, value and suit of each card can be scanned and the requisite data acquired by the scanner.

As the card slides down the front surface of the shoe, the start frame sensor 65 detects the leading edge of the playing card and generates a frame-read interrupt to CPU 34. The interrupt will start sending the serial data from the optical sensor 41 via a serial data port to RAM memory located on the CPU 34 system. Prior to the data reaching the serial data port, the serial output data of the analog optical sensor 41 is preferably thresholded or transformed to a binary value by an analog-to-digital converter 75, see FIG. 6. In a preferred embodiment, while the frame-read interrupt line remains at a logic high, the serial image bit stream will continue to be written into the memory of the CPU system 34. Software running on CPU 34 creates a two-dimensional bit-mapped image of the card suit and value of the particular card being scanned from the serial image bit stream input into the CPU 34 from the scanner or sensor 41.

Shoe 10 further includes a frame-stop sensor 40 that senses the leading edge of the playing card being fed through the slot 22. When the frame-stop sensor 40 senses the leading edge of a playing card, it will cause the frame-read to go to a logic low and stop the writing of the serial-bit stream. At this point, the entire bit-mapped card image will be stored in the RAM memory of CPU system 34. In a preferred embodiment, this bit-mapped image will be used as an input vector for a feed forward neural network executed by CPU system 34. In the exemplary network of FIGS. 7, 8, and 9, the neural network has been trained using error back-propagation to recognize all the values of the cards possible suits passing through shoe 10.

Shoe 10 accommodates the use of a magnetic stripe reader 52 (FIGS. 1, 3, 11,12, 16 and 17) and player-tracking-card(s) 15 (FIG. 3) 3, or 51, see FIGS. 11, 12, 16 and 17, for a particular player or players, and preferably shoe 10 includes a magnetic card reader 50 (FIG. 6) with slot 52, see FIGS. 1 and 3. While he or she plays the game, the player's account information recorded in the magnetic stripe of the player-tracking-card 15 or 51 is read by reader 50 and can cause the player's customer data file 72 stored on host computer 74 to be transferred to memory associated with CPU 34 system, see FIGS. 1 and 6). As the player continues to play, the customer data file of the player will be updated by the CPU system 34. When a player quits the game, casino personnel will log the player out of the game, e.g., using the alpha-numeric keyboard 60, and the customer data file will be updated, transferred to the host computer 74 and closed. Of course the file can be re-opened by the insertion of the specific player-tracking-card 15 or 51 into a magnetic stripe reader 50 within the casino's system, or manually, e.g., using keyboard 60 to enter the customer's file number to open the customer's file.

As noted, in a basic embodiment, magnetic stripe reader 50 is built into shoe 10 (FIG. 1). Host computer 74 may be connected or coupled to CPU system 34 in shoe 10 in a variety of methods well known in the art, including coupling via a LAN connection 45. When a customer's player-tracking-card 15 or 51 embedded with, or containing the customer account number, is inserted into magnetic card reader 50, the customer's data file stored on the host computer 74 will be called. Customer account information such as name and account number embedded in the magnetic stripe of the player-tracking-card 15 can be displayed on the LCD display 6, and keyboard display 62, and on keyboard and LCD display 09. Casino personnel can then verify the [customers'identification] *customers' identification* using specific keyboard key functions to sequentially access specific fields within the customer's data file and to enter information to or retrieve information from the customer's data file as deemed necessary or desirable. Such typical information may include Name, Address, Date of Birth, Social Security Number, Credit line, Cash on deposit, Year-To-Date-Win, Year-To-Date-Loss, Minimum Bet/Maximum Bet/Average Bet/Total Amount Bet, Start Time, Stop Time, Total Time Played, Cash Transaction Reporting, Debit and Credit Transactions, Chips-To-Table, and Chips-Removed-From-Table.

After transfer of the customer data file from the host computer 74 to CPU system 34, the keyboard 60 (see FIGS. 6, 12 and 13) can be used by the dealer or casino personnel to then log in that customer as playing in a specific seat at the game table 79 (see FIG. 14). In FIG. 14, the depicted configuration includes an imprinted game table layout 50 an LED score display 80, a card discard rack 81, a drop box slot 82, a chip tray 83, an imprinted commission owed seat designation 84, an imprinted commission box 85, an imprinted Player hand bet box 86, an imprinted Bank hand bet box 87, an imprinted Tie hand bet box 88, an imprinted Player for faced-up Player hand's game cards 89, an imprinted Bank for faced-up bank hand's game cards 90, embedded Player, Bank, and Game Round Results indicator light 25, three bet-type indicator lights 91, one each for a bet on the Player hand, the Bank hand, and the Tie hands bet, an imprinted seat designation 92. In FIG. 19, the depicted configuration includes a game table 101, a Deal 7 button that acts as a toggle switch to manually activate the software to raise or lower the card barriers 116 & 119, a Burn 43 button to record those cards that have been removed from the deck, and removed from the play of the game, and placed in the card discard can 96, a Shuffle 46 button to signal the software that a freshly shuffled deck has been placed in the shoe 10 and reset all settings for the current deck to zero, an imprinted game table layout 50, a dealer tip can 95, a drop box slot 82, a chip tray 83, an accumulated commissions owed LED display 99, an last commission owed LED display 100, imprinted commission owed seat designation 84, an imprinted Player hand bet box 89, an imprinted Bank hand bet box 90, an imprinted Tie hand bet box 88, an imprinted Player for faced-up Player hand's game cards 89, an imprinted Bank for faced-up bank hand's game cards 90, embedded Player, Bank, a color coded Game Round Results indicator light 25, a Display 94 button that the dealer, the "Caller", presses to cause the system to display a computer generated graphic image of each card dealt, including its card value, card rank, suit and the sequence in which each card comprising the Player and Bank hands were delivered from the shoe, as identified by the system as being designated for delivery to the Player and Bank hands, are displayed on the Bank LCD display 97 and the Player LCD display 96 when the game hands have been scanned by the system scanner before the cards are delivered to the Player or Bank hands; and whereas the graphic display is preferably activated by the "caller" after both the Player and Bank hands have been completed and the hands are faced up before the dealer, "caller"; and at least one "Base" dealer keyboard and LCD display for the "Base" dealer to enter, retrieve and display player, game and table information generated and recorded by the shoe system, and three bet-type indicator lights 91, one each to represent the presence or non-presence of a bet on the Player hand, the Bank hand, and the Tie hands bet, and an imprinted numeric seat designation 92 for each player position available at the game table.

Once the customer is logged to a specific seat at the game table 79, the player-tracking-card 51 is removed from the magnetic card reader slot 52, the seat number 92 (see FIGS. 14 and 19) being played by the customer, when entered by the casino personnel, will light-up on the keyboard 60 (see FIG. 13). Referring to FIGS. 13 and 21, the seat number will remain lit until such time the seat's Active seat designation is terminated using keyboard 60 or seat mode key 35 on keyboard 103, and then entering seat number 48 for the seat that is to be terminated.

When a player-tracking-card 51 assigned to a specific casino customer is used to log that customer in at a particular gaming table, preferably any information stored on the customer's CPU file maintained by the casino can be accessed, retrieved, and displayed using any or all of display 6, display, 62, and display 109. Casino personnel can then use this information to provide better service to the customer.

Referring to FIGS. 10, 12, 13, 16, and 17 keyboard(s) 60 and 102 and displays 6, 62, and/or 109 are used respectively to input and display information to and from CPU system 34 and/or host computer 74. These keyboards and displays can also be used to log-in dealers and casino pit personnel associated with the games.

It is noted that preferably some form of encryption will be installed in CPU system 34 to preserve and protect confidentiality of the data being stored and transferred, and to prevent its unauthorized interception. Operating power can be supplied by cable 56 to CPU system 34 and to all associated components. Alternatively, a self-contained battery within shoe 10 could provide operating power, and contribute to a more mobile shoe.

E. Feed Forward Neural Network Operation

The use and operation of a feed forward neural network with the present invention will now be described with respect to identification of identifying playing card suit and values using data output from scanner system 41. Referring to FIG. 6, high resolution array information stored in memory associated with CPU system 34 is reduced to a coarse image, preferably of array size 6 columns by 7 rows. This can be carried out by sectioning the larger high resolution array into, for example, a 6 by 7 grid and assigning the coarse array a gray scale value based on the number of black pixels in each grid. Thus, if all pixels in a grid are black, the gray scale will be 100% (black), if all pixels are white, the gray scale will be 0% (white), and if half the pixels are black, the gray scale will be 50% (gray). The 6×7 coarse array stored in memory is preferably converted into two 42 word vectors, a vector for the playing card value input, and a vector for the playing card suit. These vectors are used as inputs to the neural network's input layer.

Referring to FIGS. 7, 8, and 9, a feed forward multi-layer perceptron (MLP) that is trained for image recognition using back-propagation is preferably used in the present invention, although other recognition techniques could instead be used. The neural network consists of neurons and weighted connections between the neurons. The following equations are used to describe the operation of the basic three-layer feed forward multi-layer perceptron shown in the figures:

for I=m+1 to N+1

$$\text{net}_i = \sum_{j<1} W_{ij} * X_j$$

$$X_i = \text{logsigmoid}(\text{net}_I)$$

$$Y_i = X_{I+N} \; (X_0 = 1)$$

The neural network preferably used with the present invention for card suit identification as shown in FIG. 8 will map a 42 pixel image to one of four card suits, and requires 42 inputs to represent the image grid, and 4 neurons in its output layer. FIG. 9 depicts the preferred neural network used with the present invention to recognize card value. This neural network will map a 42 pixel image to one of 13 card values, and requires 42 inputs to represent the image grid, and 13 neurons in its output layer. The two neural networks above described have a hidden layer to improve their function approximation capabilities.

In the present invention, the neural network is trained to identify card suits and values using back-propagation. The back-propagation technique adjusts the weights ($W_{ij}$) of each neuron connection until the output vector is correct for the input vector sets that would represent a given card value or suit. After training, the values of the weights will be fixed and the network will be able to identify card suit and value for any card presented to the neural network.

The networks are trained to output a 1 in the correct position of the output vector and fill the rest of the output vector with 0's. For example, if the neural network identified an "ace" input vector 1, then the first position of the output vector would be 1 and all other positions would be 0.

As stated above other scanners (optical or non-optical) can be used with complementary configured cards to acquire the card data. However, a system which can scan and read standard card decks is preferred so that specially configured cards are not required.

F. Card Dispensing Shoe with Scanner Apparatus, System and Method: Alternate Embodiment Operation Reference is made to FIGS. 10, 12, 15 and 17, with respect to the following description of an alternative embodiment of a card dispensing shoe with scanner (shoe 10 hereafter). The description will highlight differences from the previously described embodiments.

In this embodiment, CPU system 34 (see FIGS. 1, 5 and 6) may be disposed internal to shoe 10, or may be an external CPU (not shown) coupled to shoe 10 via an I/O port 56 (see FIGS. 11, 12, 16 and 17), and coupled in turn to the optical scanner 41 and to other components of the present invention, including keyboards and LCD displays. As noted, the external CPU can function as an independent CPU, may be coupled to and function with or as part of a LAN, server network, or mainframe system.

Referring to FIG. 13, an enhanced keyboard 60 on top of shoe 10, and LCD display 6 at the front of the shoe (see FIGS. 10, 15 and 17), and keyboard(s) 102 embedded in Baccarat game table 101 (see FIGS. 19 and 21) according to the present invention may be used in different combinations and can replace the keyboards and displays in the previously described embodiments of the present invention.

Preferably all keyboards and LCD displays attached to the shoe 10 can function independently of each other, or can interact with the other keyboards and LCD displays. Preferably all keyboard and LCD displays are coupled to an internal CPU (not shown) or to an external CPU that may be a custom CPU or an off-the-shelf portable or desktop personal computer coupled to the shoe via I/O port 56, see FIG. 11, 12, 16 and 17.

In contrast to the first embodiment, the alternative embodiment of shoe 10 now under discussion does not include load switch 32 (see FIGS. 1 and 6), but includes as a replacement shuffle key 46, as shown in FIGS. 13, 19 and 21. Referring to FIGS. 10, 15, and 17, when the playing cards are removed from chute 16 to be shuffled by the dealer, or when shuffled and are replaced in card chute 16, Shuffle key 46 is pressed or otherwise activated to provide a signal that a fresh deck has been shuffled and placed in chute 16, and a new deal is about to begin. Shuffle key 46 preferably is located on keyboard 60 (FIG. 13) or keyboard 102 (FIGS. 19 and 21), or embedded in game table top 101 (FIG. 19). Note that the deck count, card value, card rank, and card suit counts are always zero or reset to zero at the beginning of a new deal.

At the beginning of a new deal, before any cards are dealt to the game players, at least one card is removed from the deck in the chute 16 in shoe 10, and is "burned", i.e., discarded. To record the burn card(s), the dealer will press the Burn key 43 located on either keyboard 60 or keyboard 102, or the Burn key 43 embedded in the game table top 101 (see FIGS. 13, 19, and 21). When the dealer has removed the last burn card from shoe 10, the dealer will press the Deal key 7 on shoe 10, or Deal key 7 on keyboard 102, or the Deal key 7 embedded in the game table top 101 (see FIGS. 19 and 21). The game card value, card rank, card suit and the number of game cards burned will be considered by the software when calculating the number of cards remaining in shoe 10, and the number of card values, and card ranks for each card suit remaining in the card chute 16.

At this juncture, the software can begin calculations for the game cards dealt to the game players for the newly shuffled deck contained within the chute 16. As shown in FIGS. 10, 12, 15, and 17, when the last round indicator 8 lights, the dealer will announce that one more game round will be dealt from the cards remaining in the shoe 10 before shuffling. When the last round has been dealt from shoe 10, the remainder of the deck is to be removed from the shoe to be shuffled with the cards previously dealt from the shoe and placed in the game table card discard rack 81 (see FIG. 14), or in the card discard can slot 95 (see FIG. 19). Shuffle key 46 of keyboard 60 (see FIG. 13) or keyboard 102 (see FIGS. 19 and 21), or the Baccarat game table 101 (see FIG. 19) is pressed to end the software's calculations for the deck of playing cards most recently dealt from shoe 10.

As noted, it is understood that optical scanner 41 and other components of the earlier described embodiments of the present invention are included within this embodiment unless otherwise noted, and will function as previously described.

A standard computer keyboard is coupled to the card dispensing shoe and Baccarat game table apparatus can be used to open and close one or more software programs that have been installed in the CPU 79, or that reside on the host computer network (not shown), to access specific screens of the software programs on call, and to enter the SetUp game information for the baccarat game evaluation and player rating software.

A function of keyboard 60 and keyboard 102 (see FIGS. 13 and 21) is to signal at least one computer program whether a designated game table seat, i. e. numbered one through fifteen in FIG. 21 is active/inactive, and/or is/is not being played by a player playing the game in progress that is to be evaluated by the present invention's software program. It is noted that typical mini-Baccarat and midi-Baccarat game tables have from one to nine seats, and a standard size Baccarat game table normally has fourteen seats. Preferably keyboards and LCD displays carried by or attached to shoe 10 have a mechanism to signal at least one computer program that a designated game table seat is active/not active and/or is/is not being played by any customer playing the game in progress.

The various keys and displays shown in FIGS. 13 and 21 (and elsewhere) include a deal key 7, a sit-out key 11, a tie key 13, a rate mode key 15, a clear key 17, a player key [18,.a] *18, a* bank key 19, a reset key 20, an enter key 33, a seat mode key 35, a C-paid mode key 36, a credit slip number mode key 37, a win mode key 38, a commission mode key 39, a loss mode key 44, a display mode key 47, seat designation keys 48, cash buy-in key 53, cash out key 54, player credit paid (credit) key 57, casino chips-brought to table (buy in) key 58, casino chips removed from table (cash-out) key 59, foreign chips to table (buy-in) key 61, delete key (terminates active seat for cursor position) 63, $1,000 denomination/enter key 64 (pressing one or more numeric key(s), in sequence, i.e. 2 then five; and then the $1,000 denomination/enter key once would enter a wager or bankroll amount of $25,000 dollars for a player or game table), $100 denomination/enter key 66 (pressing one or more numeric key(s) in sequence, i.e. 4 then five; and then the $100 denomination/enter key once would enter a wager or bankroll amount of $4,500 dollars), $1 denomination/enter key 67[,] (pressing one or more numeric key(s) in sequence, i.e. 2 then 1; and then the $1 denomination/enter key once would enter a wager or bankroll amount of $21 [dollars)$5] *dollars),* $*5* denomination/mode/enter key 68, unit bet value key 70, units bet value key 71, true bet value key 72, sum bet keys 73, player tracking card/dealer account number key 76, and left and right arrow navigation keys 77 and 78[,].

Referring to FIGS. 13 and 21, when the seat designation keys 48 of keyboard 60 or 102 are used to designate a game table seat as being occupied by a participating game player during a current game round, the corresponding seat designation key 48 of keyboard 60 or keyboard 102 is activated, and preferably lights with a green color. When the seat designation keys 48 of keyboard 60 or 102 are used to designate a game table seat as not being occupied by a participating game player during a current game round, the corresponding seat designation key 48 is activated and preferably lights with a yellow color. Referring to FIGS. 11, 12, 15, and 17, if a customer tracking card is inserted into slot 52 of the magnetic stripe reader 50, the activated seat will be assigned to the customer identified by the player-tracking-card 51 and the corresponding customer data file for the current software application in use will be opened. Referring to FIGS. 13 and 21, if any keyboard's designated seat key is illuminated green, and the seat mode key 35 is held down and the illuminated key is pressed, the active seat designation will be terminated and the illuminated key's color will be yellow. If the terminated seat was assigned to a customer using a player-tracking-card 51, the data entered to the card holders customer data file will be saved and the card holder's customer data file for the current software application in use will be closed and transferred to the host computer (not shown).

Referring to FIGS. 11, 13, and 21, assume that the data entry operator (DEO) selects Rotate from the Operator Data Entry Options screen during set-up of the Baccarat evaluation software. Each segment of the segmented LCD display 30 (FIGS. 11, & 12) one segment each being assigned to display selected game data for the numeric seat designation keys 48 immediately above for the evaluation in progress, will alternate the segmented data display for all active seats at the end and the beginning of each round when the Deal key 7 is pressed, see [FIG.] *FIGS.* 10, 12, 19 and 21. The segmented display will rotate in the following order: (a) the total number of game rounds played by each active seat for the current deck or Baccarat shoe; (b) the betting proficiency of each Active seat for the current deck or Baccarat shoe; [©)] (*c*) the betting proficiency of each Active seat for all game rounds played during the game customer's current playing session; (d) the statistical probability for each Active seat relative to the game customer having knowledge of the card value of the top card of the deck before it is removed from the shoe and dealt as the first card of the Player hand for each, upcoming game round played for the current deck or baccarat shoe; (e) the statistical probability for each Active seat relative to the game customer having knowledge of the card value of the top card of the deck before it is removed from the shoe and dealt as the first card of the Player hand for each upcoming game round for all game rounds played during the game customer's current playing session; (f) the amount won or loss by each Active game seat for the current deck or baccarat shoe; and (g) the amount won or loss by each Active game seat for all game rounds played during the game customer's current playing session.

With reference to FIG. 11, any of the above display options can be individually selected by the data entry operator from the Operator Data Entry Options screen for permanent display on the display segments of LCD display 30 for all designated active seats during the course of an evaluation. Alternatively, a Blank segmented display option may be selected by the DEO. All of the above display options can be displayed simultaneously for each game round for one selected Active seat. An individual LED display 29 imprinted with a seat number is illuminated to indicate that seat as being activated for the current game round.

Referring to FIGS. 13, 14, 19, and 21, primary functions of alpha/numeric keyboard 60 and keyboard(s) 102 are to designate the Active and Inactive seats at the game tables, to record the type of wagers made by each game player occupying the Active seats, to record the bet amount for all types of wagers made by the game players during the play of the game, to record all types of debit and credit transactions for each of the game players that is relevant to calculating each customer's Earning Potential and Complimentary Equivalency, or value, to the casino, and to record all types of debit and credit transactions relevant to maintain an accurate and running real time count of the game table's bankroll or win or loss.

Preferably any data or information that can be entered, or retrieved from the software or data files using keyboard 60 and LCD display 62 (see FIG. 13) can be retrieved using keyboard 102 and LCD display 109 (see FIG. 21). Conversely, any data entered into or retrieved from the software or data files using keyboard 102 and LCD display 109 (see FIG. 21) can preferably also be entered or retrieved using keyboard 60 and LCD display 62 (see FIGS. 13).

An additional keyboard and display can be used in the alternate embodiment, e.g., by using a standard 101-key keyboard and a standard computer monitor coupled to the CPU, which is to say to the internal CPU 34 of shoe 10 or to external CPU 79. Such additional keyboard and monitor can enter and display all information or data that could otherwise be handled by the previously described keyboards and displays. Furthermore, the additional 101-key keyboard may be used to enter additional information acceptable by the software. Such information may include new [customers] *customers'* names, account numbers. The keyboard can be used to edit the date/time data files of unknown customers who have been previously evaluated, and who have subsequently been identified by casino personnel.

Preferably, primary software functions include identifying and recording the card values, card ranks, cards suits for the cards comprising the game deck, and further recording the sequence in which each of the game cards is removed from the deck to be burned or delivered to the Player or Bank game hands for each game round played. The software also activates the barrier locking mechanisms (see FIG. 22) during the process of burning the requisite number of game cards preparatory to dealing the first game round from the deck contained in the card chute in shoe. The software also activates the barrier locking mechanism when, per game rules, the last card for the current game round has been removed from the shoe for delivery to the Player or Bank hand. The software also compares the type of wager made by each game player for each game round played to the value of the first game card dealt to the Player hand each game round and uses such information to calculate each game player's betting proficiency, game advantage, and/or statistical probability of each game player having a prior knowledge of the game card value of the first card dealt to the Player hand before that card is removed from the shoe or before each player makes his/her wager for the upcoming game round. Further, the software also provides a real time graphic display of the card value, card rank, card suit and the sequence in which each game card was dealt to the Player and Bank hands for each game round played, and in general to identify all traditional forms of cheating the game of baccarat during real time.

In yet another function, the CPU 79 includes a memory which stores data representing the correct sequence of cards to be dealt according to the rules of the game. By scanning the cards the CPU 79 compares the cards dealt to the data of the memory to confirm that the cards have been correctly dealt according to the rules of the game. In the event of a detected misdeal, the CPU 79 can generate a signal to the dealer and control the barriers to close and prevent further dealing of cards until the misdeal has been resolved.

In regards to a misdeal it should be understood that the shoe according to the present invention can also be used as a tutorial device to train dealers in the proper sequence for the dealing of cards to players. By means of the tutorial device a totally novice dealer can deal the game without making an error in the delivery of the game cards to the game hands.

Still further, the CPU 79, receiving data as to the cards dealt and having stored in memory the Baccarat third card draw rules, can be programmed to issue signals (at a color coded display carried by the shoe and/or embedded in the game table top, voice or otherwise) to signal the dealer which hand(s) if any are entitled to a third card.

G. Operation of the Software

A description as to use of software associated with CPU system 34 in real time evaluation of the betting skills of all players seated and playing the game of casino Baccarat will now be given. As each card image is scanned by optical sensor 41 in shoe 10, software, preferably but not necessarily, a neural network recognizes the images printed on the face of each card, and processes the resultant vector. The CPU and software combination will:

(1) Assign a specific numeric value to each card value, card rank and card suit for the cards comprising the deck, a card value, card rank and card suit and a card count value to each card passed over and identified by the optical scanner;

(2) Keep track of the number of cards played from and remaining in the deck and the number of the card values, card ranks, and card played and remaining in each suit of the deck;

(3) Calculate and display on at least one preferably LCD display attached to the shoe the seat number and the total of the game cards comprising the hand(s) dealt to the Player and Bank hands, and the sequence in which each of the game cards is dealt from the shoe for delivery to the Player or Bank hands and whether third cards are to be dealt;

(4) Calculate and display on at least one such display each player's betting proficiency relative to the type of bet made and the value of the first card dealt to the Player hand for each game round played;

(5) Calculate and display on at least one such display and/or at least one remote monitor during real time each player's game advantage betting relative to the type of bet made and the value of the first card dealt to the Player hand for each game round played;

(6) Calculate and display on at least one such display and/or at least one remote monitor during real time the statistical probability of each game player having knowledge of the card value of top card of the deck or the game card value of the first card dealt to the Player hand for each game round played;

(7) Identify the active seats and the betting opportunities for each game player position during the course of the play of the game to signal the CPU software program to which hand (Player's or the Banker's) each card dealt from the shoe is assigned; and (8) Identify the betting opportunities for each active seat and signal the CPU software program which betting opportunities were exercised by each active seat during the play of each game round.

Referring to FIGS. 10, 12, 14, 15, 17 and 19, as noted shoe 10 is coupled to an internal CPU system 34 and/or to an external CPU (not shown) that can be coupled to a LAN or WAN server CPU or mainframe computer system. By way of example, assume an embodiment including additional keyboards and displays, e.g., a standard 101-key keyboard and computer monitor coupled to the CPU 79 and present at the game tables 79 or 101, see FIGS. 14 and 19. A CPU (not shown) for use in a typical installation at a game table 79 or 101 may be positioned on a moveable platform or drawer attached to the underside of the game tables. (The CPU may be located at a remote location and be coupled to shoe 10 and game tables 79 or 101 via hard-wiring or wirelessly.) When the CPU, monitor, and keyboard are needed, the dealer will pull the drawer from beneath the game table to access the monitor and keyboard. It is noted that a modern notebook style computer can be incorporated into a game table 79, 101, according to the present invention.

In this example, it is assumed that when the Baccarat evaluation software was originally installed on the casino's CPU[.] (not shown), set-up menus such as Operator Data Entry Options, Casino Staff Program Users, Game Entry Options, Game Set Up, Comps Default Options, Tables, Rules, Password, and Comps were called. It is also assumed that data relevant to the casino's staff and the parameters of the baccarat game offered by the casino to its baccarat customers were entered. In this example, Rotate has been selected from the Operator Data Entry Options as the display mode for the shoe's segmented LCD display 30, as shown in FIG. 11, and/or as the game data display of the Baccarat evaluation software data entry screen. Selection of Rotate display mode can result in the current evaluation's game data for each active seat or player, during and at the end of each game round dealt from the shoe. Such data includes rounds played, betting proficiency, game advantage, probability of player having prior knowledge of the value of the first card dealt to the Player hand each game round played, and win or loss for the current playing session.

H. Player and Bank Hand Advantages When Baccarat Card Game

Players Have Prior Knowledge of the Value of the First Card to be Received by the Player Hand More than one method may be used to calculate a Baccarat player's betting proficiency when for each hand played during each round of the game, the sum of the player's bets vary in direct relationship to a selected card count system's true count at the beginning of the round to be dealt. An exemplary method to calculate a player's betting proficiency is given herein.

I. Software Features when Utilizing a LAN Network System

Software associated with the present invention is also useful in interfacing with a casino LAN network system coupling the game tables.

Information obtained by a shoe according to the present invention can be coupled to the LAN to enable additional casino personnel to monitor and oversee game play at any selected game table. Network functions include, without limitation, calculating and displaying simultaneously on at least one remote monitor during real time total of the game cards comprising Player and Bank hands at a particular game table, card value and rank and suit and sequence in which each game card was dealt from the shoe.

Thus, on a real time basis, all pertinent game data for a game table under evaluation can be displayed and recorded remotely, without knowledge of the game players at the table, whose game skills may be under observation. Such information may be merged with existing casino video and VCR game and security facilities to provide a comprehensive system to better enable the casino to identify individual(s) suspected of cheating or other undesired game activities. The casino may then choose to take the appropriate action to protect themselves from such players to prevent unwanted table losses, thus saving the casino substantial amounts of money.

As described later herein with respect to FIGS. 23A and 23B, the shoe software may also be interfaced with a server system that can communicate with remotely located bettors over various communications media, including the internet. Such individuals can see video of the game table top including OCR scanned views of each card dispensed from the shoe, and can bet over the media. Bets can be resolved by a server system coupled to the shoe. Winning bettors can have their accounts with the casino incremented in real time, and losing bettors will have their accounts debited in real time.

J. Card Dispensing Shoe with Scanner Apparatus, System and Method: Alternate Embodiment Operation:

FIG. 22 depicts the front card outlet 22 of a shoe 10 whose housing 12 contains a left movable barrier 116 operatively coupled to a moving mechanism 117, and that contains a right movable barrier 119 operatively coupled to a moving mechanism 118. Barriers 116 and 119 function to prevent any person from removing a card from housing 12 before the rules of a game in play permit. As such, barriers 116, 119 are movable between a blocking or barring position (raised in FIG. 22) in which no card can be removed from shoe 10, and a non-barring or non-blocking position (downward or lowered in FIG. 22) in which a card can be pushed out of shoe 10 in a normal fashion through-the card outlet 22.

In the embodiment described, software associated with CPU system 34 is pre-programmed with game rules for the card game currently being played at game table 79, the cards for which will be dispensed from shoe 34. An output signal from CPU system 34 can command moving mechanisms 117 and 118 to move their respective barriers into the barring or non-barring position, according to the rules of the game. Without limitation, mechanisms[.] 117, 118 may be small solenoids or electromagnets that mechanically or electromagnetically move barriers 116, 119 into the position commanded by CPU 34.

For example, assume that shoe 10 is used to secure and monitor a game of Baccarat to be played at table 79. Software associated with CPU system 34 will include the rules for Baccarat. System 34 preferably is coupled to receive output from scanner 41, and thus knows when the final card for a game round has been dealt from shoe 10, and will command moving mechanisms 117, 118 to move barriers 116, 119 into a raised position to block removal of any additional cards from shoe 10. The game dealer can now settle wages on the completed game round, without having to scrutinize the shoe. The various players will now make their bets for the upcoming game round before removal and delivery of the top card from the deck within shoe 10. Since game rules preclude removing a card from the shoe during this phase, barriers 116, 119 remain in a card blocking position. Once bets have been made, the dealer will record the amounts and bet types (e.g., Player, Bank, Tie) for each player (or the system itself can be used to so record), and will then press an input device such as a keyboard key carried by the shoe, or embedded in the game table top 79, 101. The input device will signal CPU system 34 (e.g., via wires, or wirelessly), whereupon moving mechanisms 117, 118 will move barriers 116, 119 in a lowered position (in this example) to allow removal of game cards from shoe 10 for delivery during the current game round.

CPU system 34, by executing associated software will know when card access via card slot outlet 22 in shoe 10 is against the Baccarat game rules. Importantly, when game rules so require, CPU system 34 will command moving mechanisms 117, 118 to move barriers 116, 119 into the blocking position, to prevent anyone from removing the top card or even attempting to turn up a corner of that card to get a glimpse at what the suit or value might be. As noted elsewhere here, in Baccarat, prior (illicit) knowledge of what the top card that is about to be dealt will be can enable individuals with such knowledge to make large bets with a substantially high statistical probability of success as to game outcome of each game round.

Barriers 116, 119 are hidden from view of the dealer and players, as the barriers preferably are internal to housing 12. However while the barriers are in the blocking position, any person attempting to move a card out of slot 22 will be unsuccessful because the barriers physically obstruct preferably at least 0.75" at each end of the card when an attempt is made to remove the card from shoe 10 via outlet 22. (A standard playing card is 3.5" high and 2.5" wide, and a deck of cards is laid on its side when placed in shoe 10.) Indeed, in the blocking position, the outermost corner edges of the card are protected by the barriers. Thus, neither a card nor a card portion, can be (illegally) pushed out of the shoe by any person for a sneak peek as to what the suit or value of the first card to be removed from the shoe for delivery to the Player hand will be.

Once all bets have been made, as signaled automatically into CPU system 34 by electronic placing of the bets themselves, or as signaled into CPU system 34, e.g., by game table bet sensors 86, 87 and 88, or by the casino dealer using input mechanism 60, the rules of the game permit access to the top card in deck 16. Accordingly, the software executed by CPU system 34 will result in the CPU commanding barriers 116, 119 to be moved into the unblocking position by their respective moving mechanisms. At this juncture, with the barriers in the unblocking or unbarring position, a card may be withdrawn from shoe 10.

Note that confidence in the integrity of the play of the game is enhanced by virtue of the blocking shoe mechanism shown in FIG. 22. Even if the dealer was somehow unaware of the game rules, was fatigued or otherwise inadvertent or perhaps even dishonest, no one can gain access to the top card of the deck within the shoe until all active player seats have made a bet for the upcoming game round. As such, experienced and inexperienced players alike can have more confidence in the integrity of the game, playing the game of Baccarat. Further, other individuals who may wish to bet on the game outcome can similarly have enhanced confidence in the integrity of the game, including bettors who are far remote from the casino game table where play of the subject game is being monitored by 10.

Further in reference to FIG. 22 a color coded game round results indicator light 25 may be housed within the shoe 10 in front of the card outlet 22. CPU 34 is programmed with the game rules and calculates the score for the game rounds played. When the system identifies that the game hands have tied the game round results indicator light 25 will illuminate preferably with the color Rose, when the Player hand wins the game round the game round indicator light 25 will illuminate preferably with the color Gold, and when the Bank hand wins the game round indicator light 25 will illuminate preferably with the color Blue. A color coded $3^{rd}$ Card Rule tutorial light 19 for the Player hand, and a color coded $3^{rd}$ Card Rule tutorial light 21 for the Bank is housed by the shoe 10 in front of the card outlet 22. When the original two cards that comprise the Player and Bank hands have been dealt from the shoe, if the rules of the game require the Player hand to draw a $3^{rd}$ Card, the $3^{rd}$ Card Rule tutorial light 19 for the Player will illuminate preferably Green, prompting the game dealer to call and draw, or call for the designated player Banker to draw, a $3^{rd}$ Card for delivery to the Player hand; and if the rules of the game require the Player hand to stand on the original two cards that comprise the Player hand the $3^{rd}$ Card Rule tutorial light 19 for the Player hand will illuminate preferably Red indicating that no more cards are to be dealt to the Player hand for the current game round. When the Player hand has been completed the $3^{rd}$ Card Rule tutorial light 21 for the Bank hand will illuminate preferably Green prompting the game dealer to call and draw, or ask the designated player Banker to draw, a $3^{rd}$ Card for delivery to the Bank hand if the game rules require the Bank hand to take a third card; and if the rules of the game require the Bank hand to stand on the original two cards that comprise the Bank hand the $3^{rd}$ Card Rule tutorial light 21 for the Bank hand will illuminate preferably Red indicating that no more cards are to be dealt to the Bank hand for the current game round. When the Bank hand has been completed the game round is over and the system software will automatically raise and lock the card barriers 116 and 119 to prevent the game dealer from removing any additional cards, or from having any access to the face of the top card in the shoe until all wagers for the upcoming game round have been made by the game players.

A tricolored light emitting diode 44 (LED) is contained within each of the $3^{rd}$ Card tutorial lights 19 & 21, and within the game round results indicator light 25.

K. Use of Card Dispensing Shoe with Scanner Apparatus System With Remote Bettors From a casino's standpoint, one problem with Baccarat is that for substantial periods of time there are no customers playing at an open Baccarat game table, yet the overhead and labor costs associated with keeping a Baccarat game open, with or without wagering customers, is high. It would indeed be productive if the casino could process bets on each of its open Baccarat tables, essentially twenty-four hours a day, every day of the year.

The rules for the game of Baccarat are fixed, and the individual or customer receiving the game cards designated for the Player or Bank hands can make no arbitrary decisions on the received hand, the outcome of each Baccarat game round (or game play) is essentially pure luck, absent cheating. Thus it matters little whether actual players played the game wagered on the outcome of each game round, or whether casino employees (shills) played the game, and outsiders (local to the game casino game tables, or remotely located) made bets on the outcome of each game.

Use of the various embodiments of the present invention, including the security enhancing shoe described with respect to FIG. 22, can expedite the play of the game. Further, the present invention can prevent and identify errors made by the dealer or acting "Banker" when delivering cards to the Player and Bank hands during each game round, and can identify any game rounds in which one or more cards dealt from shoe 10 may have been substituted or switched, and thereby instill and maintain player and bettor confidence in the integrity of the game. Collectively these functions can assure players and bettors (including remotely located bettors) that the game is above board and that the outcome of a game round will not be reversed due to a challenged dealer error, or due to substitution or switching of a game round card, if in fact shoe 10 can preclude dealer error and can identify when a card dealt to the Player or Bank hand has been illegally substituted or switched by a dishonest dealer or player.

Figure 23A:
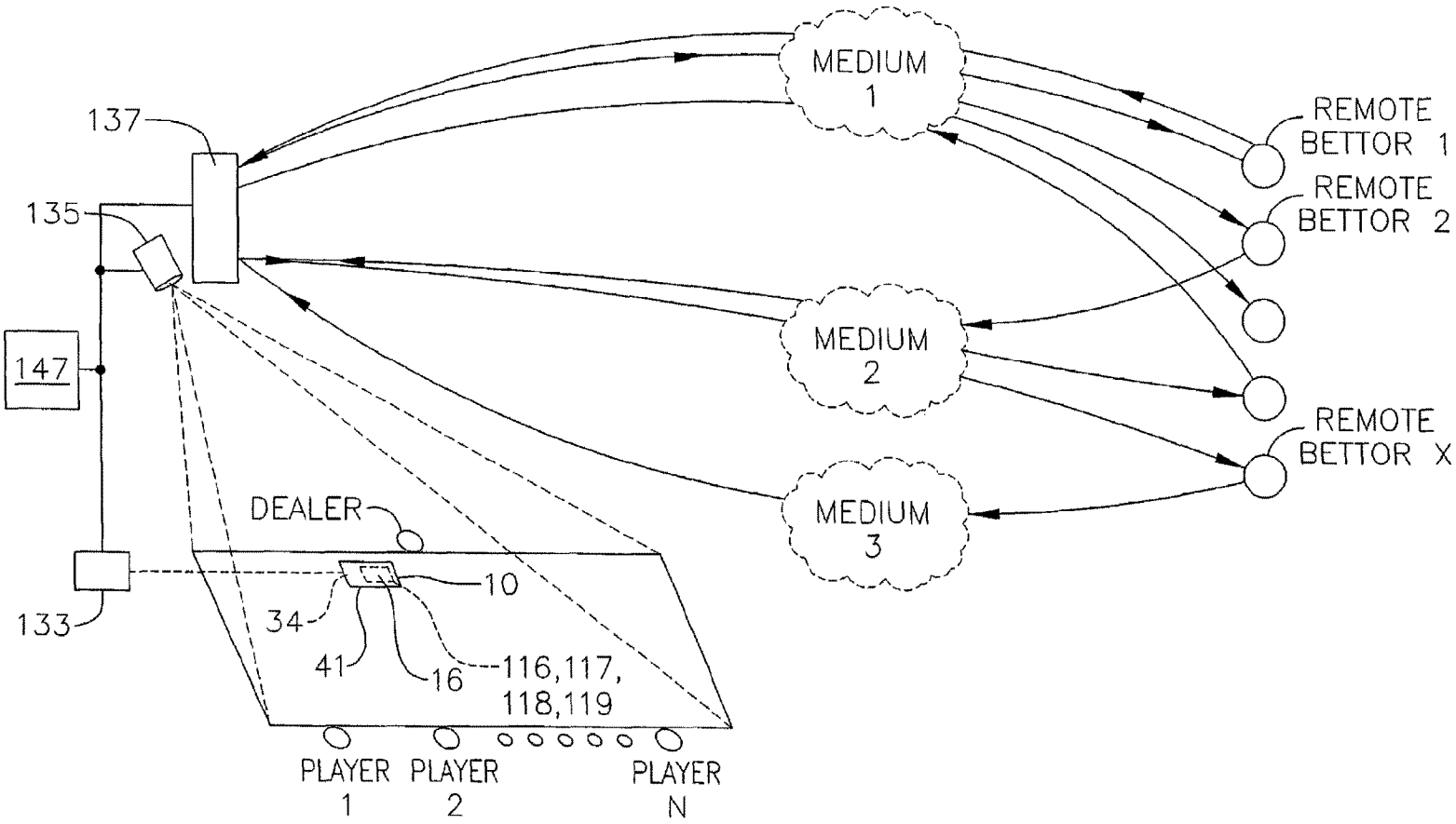
FIG. 23A is a block diagram depicting a system enabling remote viewers to wage bets in real time on an actual card game of chance played using a shoe and scanner, according to the present invention.

FIG. 23A depicts a casino game table 79 (or 101) at which a dealer and a number of players equal to N are physically present. Assume that the game to be played is Baccarat and that a shoe 10 as described herein in its various embodiments is used to dispense game cards from deck 16 to the Player and Bank hands. A video camera 135 focuses upon the game table 79 (or 101) and shows shoe 10, and the various cards as they are dealt from the shoe, but preferably does not show the players' faces unless in fact each player wishes to be shown. (In practice, a sign posted on each game table will inform the game players that a video image of the game and players may be broadcast, for example over the internet.)

A circuit 133 can combine the scanner 41 information that can be processed by CPU system 34 with video information from video camera 135, for example, to enable video signals from camera 135 to show not only what is on table 79 but to also include a computer generated image of each card (excluding burn cards) that passes over the scanner 41 housed within shoe 10 as each card is removed from the shoe for delivery to game players, or to the Player and Bank hands for each game round. The computer generated image can be generated from scan image data, or can be independently generated. An interface system 137 then promulgates the combined video information and other data via at least one medium, e.g., medium 1 and/or medium 2 and/or medium 3 in FIG. 23 for receipt by at least one remote bettor. By "remote" it is understood the bettor in question could be hundreds of feet from the actual gaming table or could be many thousands of miles distant.

Without limitation, a medium may include the internet, wireless transmission, optical cables, telephone lines, etc. The remote bettors can place bets on the outcome of each game round being played on table 79 (or 101) by players, some of whom may in fact be casino employees (shills) if there are no [of] independent players actively playing the game. Bet information from a remote bettor need not be communicated back to interface system 137 by precisely the same medium used to send information to the bettor. Thus, remote bettor 2 might [received] *receive* video information via medium 1, the internet perhaps, but might send bet information via medium 2, the telephone system perhaps, back to interface 137.

Figure 23B:
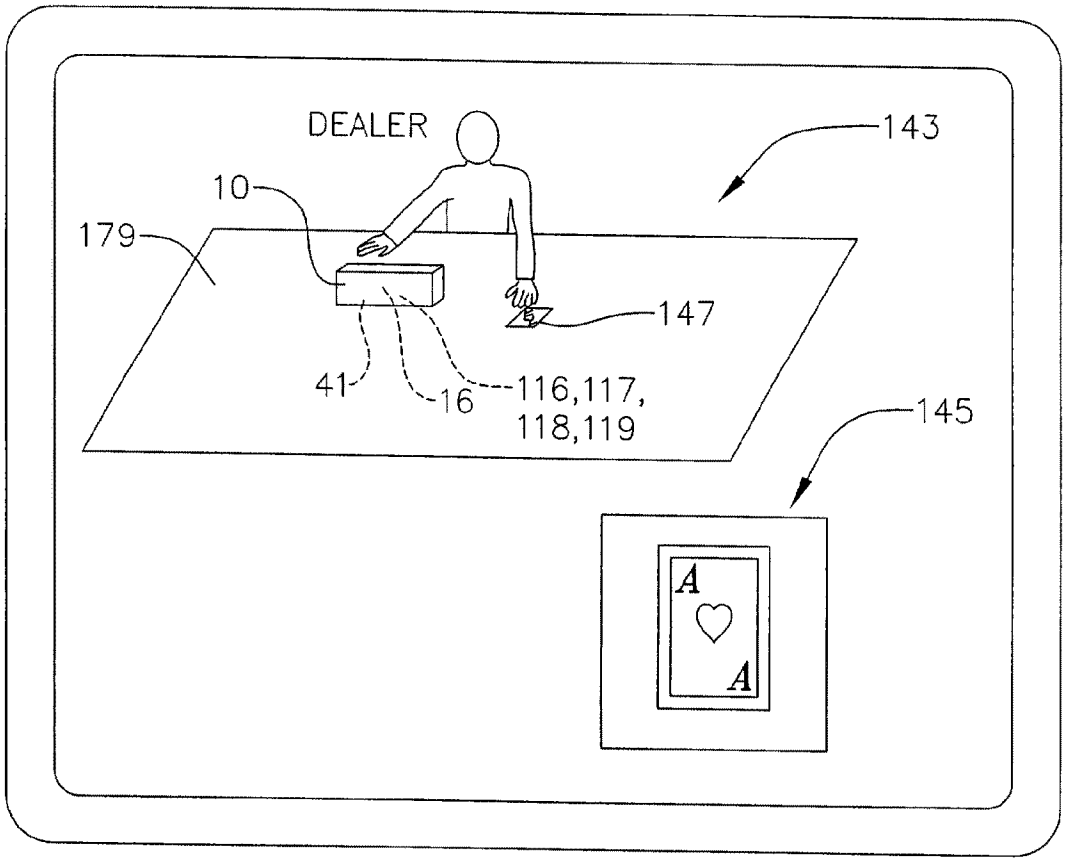
FIG. 23B depicts an exemplary display of video information as seen by a remote viewer who may wish to wage bets via the system of FIG. 23A, according to the present invention.

FIG. 23B depicts a typical video information display 141 as seen by each remote bettor, perhaps on a computer monitor or a TV screen. The display will include an actual image 143 of the game, showing table 79 (or 101), shoe 10, and each card 147 dealt from the shoe. Preferably the display will also include the scanned image 145 of each card dealt, such that a remote bettor need not sit close to display 141 to actually see each card dealt. Using a home computer or telephone or other system (not shown), the remote bettor can place a bet via a medium back to system 137. The remote bettors have incentive to bet on the game play in that they know it will occur rapidly and securely, due to the use of a shoe 10, according to the present invention. After each game round, bets can be resolved rapidly, preferably by a server-type computer system 147 coupled to the remainder of the system, as indicated by FIG. 23A. It is anticipated that resolving settlement of literally thousands of bets from remote bettors could occur within less than thirty-seconds. The presence of shoe 10 thus enables and encourages remote betting, to the economic advantage of the host casino. Further the ability of remote bettors to access, view and wager on a live casino card game can serve to tutor the timid player in the play of the game before the player's potential visit to a real casino. Thus, bettor and the casino can each benefit from the remote bettor's experience with wagering over the internet or other medium.

L. Use of the System and Method in Connection with Blackjack

Where the shoe 1 is to be used in connection with the game of Blackjack, the CPU 79 has stored in its memory data representing various known player Blackjack play criteria which are intended to give the player and advantage or to minimize the casino edge for the game. This criteria may relate to a count system where players count the values of one or more cards to determine the constituency of the inventory of the cards remaining in the shoe. Depending upon the constituency of the inventory, the inventory may be "positive" in favor of the player. In such circumstances the player may (1) increase their wager to take advantage of the "positive" inventory and/or (2) make decisions as to standing or hitting his hand to try to win the game.

Still further, the CPU 79 can compare the player's play, including his wager and player hand decisions, to data stored in memory to determine the proficiency of the player in adherence with one or more player Blackjack strategies.

To frustrate possible strategy players, including card counters, the system and method includes a floating deck (inventory) penetration feature. According to prior art Blackjack dealt from multiple decks or multiple deck shoes, it has been known to command reconstitution and reshuffling of the card inventory. For example, when the dealer first shuffles and loads a shoe, he typically places a marker card in the inventory about one deck from the last card. Cards are dealt from the shoe until the marker card is dealt at which time the current hand is completed. The dealer then gathers all of the played, burned and cards remaining in the shoe to reconstitute the inventory to, for example [its], *dealer's* original six decks, and re-shuffles to randomize the inventory. The stack of shuffled decks of cards is placed in front of a player who places the marker card in the stack and the stack is cut at the marker card and thereafter is re-loaded back into the shoe. The marker card is placed in the stack about one deck (52 cards) from the last card of the shoe to signal the dealer when to re-shuffle.

If there is a suspicion that a player is playing proficiently according to some system or criteria, the pit boss may command more frequent shuffling. Frequent shuffling results in an economic loss to the casino since the time the dealer is reconstituting and re-shuffling interrupts play (and the placement and loss of wagers) and may cause impatient players to leave the table. For example, it is believed that if shoe penetration (dealing from the inventory) can be to a level of 92% (26 cards left in inventory before re-shuffling) versus 85% (where 52 cards remain in inventory), that where the average bet is $20 and there are [and] *an* average of 3.8 player's per table and assuming a round dealt every 38 seconds, the savings in less frequent re-shuffling would amount to approximately $30,000.00 per table per-eight hour shift. With some casinos having many tables, the annual savings of permitting penetration from 85% to 92% is significant. It is believed that 92% penetration versus a more shallow penetration, e.g. 75%, can produce even greater savings.

The CPU 79 according to the present invention can be configured to determine inventory penetration before re-shuffling based upon the strategy and/or betting proficiencies of the players. For example, when the shoe is loaded with the six decks of shuffled cards before the first hand, the memory for the system can include data representing the number of cards, i.e. 52×6=312 cards as well as the constituency of the inventory (at least values of cards according to the valuation of cards according to the rules of Blackjack). As cards are "burned" and dealt the scanned data of the cards is processed to determine one or more of the following (1) the cards dealt to each player hand and the dealer hand, (2) the number of cards left in inventory, (3) the count of the inventory according to any one of known card counting systems (4) the player's proficiency in accordance with player play criteria or (5) the dealer's cards. By providing for changing deck penetration versus player proficiency, the aforesaid savings can be realized. For example, the CPU 79 may be configured to have a default penetration to a point where there are 26 cards left in inventory. When the 26 cards in inventory is reached, the present hand is completed before reconstitution and re-shuffling is commanded. The CPU 79 may generate a perceptible signal (visual or audible or both) to indicate re-shuffling is required or may control the barriers to close the shoe 1 outlet after completion of the hand to prevent the dealing of any additional cards before re-shuffling. If there is detected a player having a high proficiency with respect to a player play strategy or if the shoe is positive, the CPU 79 is configured to command re-shuffling with a lesser penetration, e.g. with 52 or 78 cards remaining in inventory. Thus where there is low proficiency, penetration can be made to the highest permitted, e.g. until 26 or less cards remain, whereas with one or more proficient players and/or where the inventory is positive in favor of the player, re-shuffling will be commanded at a lesser penetration.

Further, in regards to "back counters" referred to above, the CPU 79 may control the activation of seats previously unoccupied during previous rounds based on the composition of the deck, relative to one or more card count systems, and/or the positive or negative composition of the deck, where a positive deck represents a deck being favorable to the game players, and where a negative deck is unfavorable to the game players; or whereas the deck may in combination be positive and Ace rich. The system software would be programmed to prevent the dealer from activating a seat that was inactive the previous round when the decks true count for the upcoming game round is a positive true count greater than a predetermined value "X"; and whereas the system would allow the dealer to activate a seat that was inactive the previous game round when the decks true count for the upcoming game round is a negative true count, or a positive true count less than X. In this fashion, players may be permitted to begin play at any time since a previously non-playing card counter, aka back counter, would be prevented from gaining an unfair advantage by not being allowed to enter the game mid-shoe.

In still another aspect, it is known to broadcast both live and virtual games over the Internet for live play by remote players at their computer terminals. For particularly live games, there is a risk that the remote player would play a Blackjack card counting system with or without the aid of a computer card counting software. It would be advantageous in situations where particularly live gaming is being broadcast to be able to determine the likelihood of such activity to either control that player's participation or to command reconstitution and re-shuffling the real or virtual shoe to prevent players employing a card count system from obtaining an advantage over the casino.

Although the invention has been particularly shown and described with reference to various preferred embodiments, it will be understood by those skilled in the art that changes in form and detail may be made therein without departing from the spirit and scope of the invention.

The invention claimed is:

[1. A game monitoring system for a Blackjack card game including a dealer hand at least one player hand of cards where a player makes a wager and exercises options with respect to the player's hand according to the rules of the game, the system comprising:

a shoe including a housing having an outlet slot, said housing sized to store a plurality of playing cards defining a card inventory and configured for a dealer to dispense said cards one at a time through said outlet slot to complete said hands according to the rules of the game;

a scanner to scan said playing cards and generate a set of scanner signals determinative of the identity of cards dispensed from the shoe to each hand;

means for acquiring data representing the wager(s) made by the player;

a memory storing data representing at least one predetermined Blackjack game play criteria in relation to at least one of the player's wager or the cards dealt to at least one of said hands and data representing the constituency of the card inventory; and a computer processor to receive said scanner signals and said wager data, said processor configured to compare said acquired data to said at least one predetermined game play criteria to determine adherence by the player to said at least one predetermined game play criteria, and further configured to select the number of cards to remain in the inventory and not dealt from the shoe for reconstitution and reshuffling of the inventory, said processor processing the scanner data to determine depletion of cards from the inventory by dealing, and to leave said selected number of cards undealt and in response thereto, sending a signal to command reconstitution and re-shuffling of the inventory.]

[2. The system of claim 1 comprising said processor configured to alter said selected number of cards to remain in said inventory in response to said processor determining adherence by any player to said at least one predetermined game play criteria.]

[3. The system of claim 2 comprising a moveable barrier at said shoe outlet and said processor configured to control said barrier upon (i) determination of depletion of cards from the inventory by dealing to said selected number and (ii) completion of the current hand of play, to block further dealing of cards from said shoe.]

[4. The system of claim 3 comprising increasing said selected number of cards in said inventory to remain undealt in response to said processor determining adherence by any player to said at least one predetermined game play criteria.]

[5. The system of claim 1 comprising said game play criteria comprising a card count system and said processor configured to, from said scanner signals determine a card count system advantage for said inventory according to said card count system.]

[6. The system of claim 1 comprising a communication network in communication with at least one terminal located remotely from said game, a display for each terminal, means at each terminal for a remote player to input a wager according to the rules of the game, said processor configured to issue signals over said network to control the terminal display to display representations of the scanned cards dealt to each hand and determine whether the remote player has won or lost their wager.]

[7. The system of claim 1 comprising a communication network in communication with at least one terminal located remotely from said game, a display for each terminal, means at each terminal for a remote player to input game play strategy decisions according to the rules of the game, said processor configured to issue signals over said network to control the terminal display to display representations of the scanned cards dealt to each hand and determine whether the remote player has won or lost their wager.]

[8. The system of claim 7 comprising a communication network in communication with at least one terminal located remotely from said game, a display for each terminal, means at each terminal for a remote player to input game play strategy decisions according to the rules of the game, said processor configured to issue signals over said network to control the terminal display to display representations of the scanned cards dealt to each hand and determine whether the remote player has won or lost their wager.]

[9. A game monitoring method for a Blackjack card game which includes a dealer hand at least one player hand of cards where a player makes a wager and exercises options with respect to the player's hand according to the rules of the game, the method comprising:

dealing cards according to the rules of the game to the hands from a shoe which includes a housing having an outlet slot, said housing sized to store a plurality of playing cards defining a card inventory;

scanning said playing cards and generating a set of scanner signals determinative of the identity of cards dealt from the shoe to each hand; acquiring data representing the wager made by the player;

storing data in a memory representing at least one predetermined Blackjack game play criteria in relation to at least one of the player's wager or the cards dealt to at least one of said hands and data representing the constituency of the card inventory;

a computer processor receiving said scanner signals and said wager data, said processor comparing said acquired data to said at least one predetermined game play criteria to determine adherence by the player to said at least one predetermined game play criteria;

selecting the number of cards to remain in the inventory and not dealt from the shoe before reconstitution and reshuffling of the inventory; and said processor processing the scanner data to determine depletion of cards from the inventory by dealing, and to leave said selected number of cards undealt and in response thereto sending a signal to command reconstitution and re-shuffling of the inventory.]

[10. The method of claim 9 comprising said processor altering said selected number of cards to remain in said inventory in response to said processor determining adherence by any player to said at least one predetermined game play criteria.]

[11. The method of claim 9 further comprising providing a moveable barrier at said shoe outlet and said processor controlling said barrier upon (i) determination of depletion of cards from the inventory by dealing to said selected number and (ii) completion of the current hand of play, to block further dealing of cards from the shoe.]

[12. The method of claim 10 comprising increasing said selected number of cards in said inventory to remain undealt in response to said processor determining adherence by any player to said at least one predetermined game play criteria.]

[13. The system of claim 9 comprising storing said criteria data as data representing a card count system and said processor determining a card count system advantage for said inventory according to said card count system.]

[14. The system of claim 9 comprising establishing a communication link between said processor and at least one player terminal located remotely from said game, the player at the remote terminal inputting a wager according to the rules of the game, said processor issuing signals over said link controlling a display at the terminal to display said scanned cards dealt to each hand according to the rules of the game and determine whether the remote player has won or lost their wager.]

*15. A card handling apparatus, comprising:*

*a card shoe that is separate from any card shuffling devices, the card shoe including a housing having a card inlet positioned at an exterior portion of the housing and a card outlet positioned at another exterior portion of the housing separate from the card inlet, the housing configured to dispense playing cards through the card outlet directly to a dealer; and*

*at least one barrier disposed within the housing and at the card outlet, the at least one barrier automatically movable between a blocking position in which at least one playing card stored in the housing is prevented from being dispensed through the card outlet and an unblocking position enabling the at least one playing card to be dispensed through the card outlet.*

*16. The card handling apparatus of claim 15, wherein the housing is configured to dispense playing cards through the card outlet one at a time when the at least one barrier is in the unblocking position.*

*17. The card handling apparatus of claim 15, further comprising at least one solenoid operatively coupled to move the at least one barrier between the blocking position and the unblocking position.*

*18. The card handling apparatus of claim 17, wherein the at least one solenoid is operatively coupled to move the at least one barrier from the blocking position to the unblocking position and from the unblocking position to the blocking position.*

*19. The card handling apparatus of claim 15, further comprising a switch in communication with at least one mechanism for moving the at least one barrier between the blocking position and the unblocking position, the switch configured to command the at least one mechanism to move the at least one barrier between the blocking position and the unblocking position.*

*20. The card handling apparatus of claim 15, further comprising a processor in communication with at least one mechanism for moving the at least one barrier between the blocking position and the unblocking position, the processor programmed to command the at least one mechanism to*

*selectively move the at least one barrier between the blocking position and the unblocking position.*

*21. The card handling apparatus of claim 20, wherein the processor is programmed to command the at least one mechanism to move the at least one barrier automatically responsive to a status of a card game.*

*22. The card handling apparatus of claim 21, further comprising at least one sensor operatively associated with the processor and configured to sense a status of the card game.*

*23. A card handling apparatus, comprising:*

*a housing having a card outlet, the housing configured to dispense playing cards through the card outlet, the housing including a stationary card storage area positioned adjacent to the housing, the stationary card storage area being fixed relative to the housing;*

*at least one barrier disposed within the housing, the at least one barrier movable between a blocking position in which at least one playing card stored in the housing is prevented from being dispensed through the card outlet and an unblocking position enabling the at least one playing card to be dispensed through the card outlet;*

*a processor in communication with at least one mechanism for moving the at least one barrier between the blocking position and the unblocking position, the processor programmed to command the at least one mechanism to selectively move the at least one barrier between the blocking position and the unblocking position;*

*a scanner disposed in the housing to scan each playing card dispensed through the card outlet and to generate a signal representative of an identity of each card; and*

*a memory configured to store predetermined rules for a card game, wherein the processor is in communication with the scanner and the memory and programmed to process the signal and to identify each card dispensed through the card outlet, and wherein the processor is programmed to command the at least one mechanism to move the at least one barrier automatically responsive to the predetermined rules for the card game stored in the memory.*

*24. The card handling apparatus of claim 23, wherein the memory stores predetermined rules for Baccarat.*

*25. The card handling apparatus of claim 20, wherein the at least one barrier is movable into the blocking position by the at least one mechanism responsive to the processor and movable into the unblocking position by the at least one mechanism responsive to the processor.*

*26. A method of handling cards, comprising:*

*disposing a plurality of cards within a card shoe that is separate from any card shuffling devices, the card shoe comprising a housing having a card outlet;*

*positioning at least one barrier in a blocking position to prevent cards of the plurality of cards in the housing from being dispensed through the card outlet with the at least one barrier;*

*positioning the at least one barrier in an unblocking position to enable cards of the plurality of cards to be dispensed through the card outlet;*

*dispensing cards of the plurality of cards from the housing through the card outlet; and*

*moving the at least one barrier between the blocking position and the unblocking position according to rules of a card game and responsive to a processor command.*

*27. The method of claim 26, further comprising moving the at least one barrier between the blocking position and the unblocking position with at least one mechanism.*

*28. The method of claim 26, further comprising:*

*moving the at least one barrier to the blocking position with a solenoid; and*

*moving the at least one barrier to the unblocking position with a solenoid.*

*29. The method of claim 26, further comprising moving the at least one barrier between the blocking position and the unblocking position responsive to a manually controlled switch.*

*30. The method of claim 26, wherein moving the at least one barrier between the blocking position and the unblocking position responsive to a processor command comprises moving the at least one barrier according to rules of Baccarat.*

* * * * *